(12) United States Patent
Cioanta

(10) Patent No.: US 10,874,124 B2
(45) Date of Patent: Dec. 29, 2020

(54) ACOUSTIC PRESSURE SHOCK WAVES USED FOR MEAT PROCESSING

(71) Applicant: SANUWAVE, INC., Suwanee, GA (US)

(72) Inventor: Iulian Cioanta, Milton, GA (US)

(73) Assignee: SANUWAVE, INC., Suwanee, GA (US)

( * ) Notice: Subject to any disclaimer, the term of this patent is extended or adjusted under 35 U.S.C. 154(b) by 61 days.

(21) Appl. No.: 15/801,675

(22) Filed: Nov. 2, 2017

(65) Prior Publication Data

US 2018/0116260 A1 May 3, 2018

Related U.S. Application Data

(60) Provisional application No. 62/416,735, filed on Nov. 3, 2016.

(51) Int. Cl.
*A23L 5/30* (2016.01)
*A23B 4/015* (2006.01)
*A23L 3/30* (2006.01)

(52) U.S. Cl.
CPC ............... *A23L 5/30* (2016.08); *A23B 4/015* (2013.01); *A23L 3/30* (2013.01); *A23L 5/32* (2016.08); *A23V 2002/00* (2013.01)

(58) Field of Classification Search
CPC ..... A23L 5/30; A23L 5/32; A23L 3/30; A23B 4/015; A23V 2002/00
See application file for complete search history.

(56) References Cited

U.S. PATENT DOCUMENTS

| 3,941,670 | A | * | 3/1976 | Pratt, Jr. ............... A23L 3/26 204/157.61 |
| 4,219,889 | A | * | 8/1980 | Parssinen ............. B06B 1/0618 367/158 |
| 5,273,766 | A | | 12/1993 | Long |
| 5,328,403 | A | | 7/1994 | Long |
| 5,939,115 | A | | 8/1999 | Kounev et al. |
| 6,168,814 | B1 | | 1/2001 | Long |
| 6,224,476 | B1 | | 5/2001 | Long et al. |
| 6,264,543 | B1 | * | 7/2001 | Garcia ................. A22C 9/002 452/141 |
| 9,095,632 | B2 | | 8/2015 | Cioanta et al. |
| 2002/0034565 | A1 | | 3/2002 | van Esbroeck et al. |
| 2002/0072318 | A1 | * | 6/2002 | Long ..................... A22C 9/00 452/141 |
| 2009/0324786 | A1 | | 12/2009 | McNaughton |
| 2011/0136421 | A1 | | 6/2011 | Brink et al. |
| 2013/0231034 | A1 | * | 9/2013 | O'Neil ................. A22C 17/08 452/173 |
| 2014/0212554 | A1 | * | 7/2014 | Cioanta ................ A61L 2/02 426/234 |

FOREIGN PATENT DOCUMENTS

WO 2010020696 A1 2/2010

OTHER PUBLICATIONS

International Search Report and Written Opinion distributed by Lee W. Young of the ISA/US—dated Apr. 5, 2018.

\* cited by examiner

*Primary Examiner* — Steven N Leff
(74) *Attorney, Agent, or Firm* — Polsinelli PC; Eric Hanson, Esq.

(57) ABSTRACT

Methods for treating animal carcasses prior to processing for meat consumption include applying acoustic pressure shock waves to an animal carcass to reduce contaminants on the carcass for improved safety when distributed as meat.

21 Claims, 22 Drawing Sheets

ACOUSTIC PRESSURE SHOCK WAVES USED FOR MEAT PROCESSING

CROSS-REFERENCE TO RELATED APPLICATIONS

This application claims the benefit of priority of U.S. provisional application No. 62/416,735, filed Nov. 3, 2016, which is incorporated herein by reference in its entirety.

BACKGROUND OF THE INVENTION

There are many factors affecting the cleaning process efficiency and are needed to be considered before developing GMP (Good Manufacturing Practices) and GHP (Good Hygiene Practices) for meat and dairy processing plants. Some of the important factors are the sanitary consideration of the plant that include the plant layouts, interior and exterior of the plant, its location, waste disposal and drainage, materials used food contact surface, separate clean and dirty areas, full access (360 degrees) for equipment, and installation. Many of these requirements are accomplished through equipment design, good cleaning and sanitizing procedures and good written sanitation programs and monitoring procedures.

Animal meat/carcass contamination during slaughtering is unavoidable and therefore it needs to be kept as low as possible. Highly contaminated raw meat is unsuitable for further processing. Final products made from hygienically deficient raw meat materials are unattractive in color, tasteless or untypical in taste with reduced shelf life due to heavy microbial loads. Moreover, there is also the risk of presence of food poisoning microorganisms, which can pose a considerable public health hazard.

The goal of cleaning (make the product free of visible soil/manure) and sanitizing (reduce the number of bacteria to a safe level) is to control pathogens and prevent foodborne illness produced by *Listeria monocytogenes, Salmonella, Staphylococcus aureus*, etc. and to control spoilage produced by bacteria, yeast, molds and others that can cause economic spoilage and decrease shelf life of the meat products.

Cleaning and sanitizing processes in the meat and dairy processing plants employs different types of detergent and energy in the form of pressure, hot water, and physical removal like scrubbing, etc. In general the cleaning efficiency is improved by employing chemical detergents. Selection of detergents depends on factors as nature of soil of detergent, rinsability, corrosiveness property, compatibility with other sanitizers and safety issues during handling of the detergent. Detergent should be used in concentrations just above the critical micelle concentration (CMC) that ranges 800 to 900. The critical micelle concentration (CMC) is defined as the concentration of surfactants above which micelles form (aggregate or supramolecular assembly of surfactant molecules dispersed in a liquid colloid) and all additional surfactants added to the system go to micelles.

Sanitization is the process of reducing microbiological contamination to a level that is acceptable to local health regulations. There are different types of sanitizing solutions as antiseptics (agents used against sepsis or putrefaction connection with human beings or animals), disinfectants (agents that are applied to inanimate objects and it does not necessarily kill all organisms), sanitizers (agents that reduce the microbiological contamination to levels conforming to local health regulations), germicides (agents that destroy microorganisms), bactericides (agents that cause the death of a specific group of microorganisms) and bacteriostatics (agents that prevent the growth of a specific group of microorganisms but do not necessarily kill them).

Factors affecting the efficiency of the sanitizers are concentration of sanitizers, temperature, and duration of contact, acidity and alkalinity of the solution and presence of organic matter on the surface. Halogen based sanitizers (chlorine and iodine)—chlorine most widely used and have an oxidizing effect used for bacteriostatic action and works the best in a low pH environment. Their limitations are given by their high corrosive action on metals at high temperatures and certain resultant compounds that are undesirable (produce health hazard).

For both cleaning and sanitizing agents that involves chemicals it was demonstrated that in time microorganisms mutate and practically are no longer susceptible to the action of detergents or sanitizing agents, as demonstrated in the publication "Bacterial Mutation; Types, Mechanisms and Mutant Detection Methods: A Review". Therefore, it is important to find new mechanical methods that can destroy microorganism and their biofilms. Acoustic pressure shock waves produce strong compressive forces and cavitation in liquids that can be used to destroy such contaminating microorganisms, without triggering a mutation mechanism. On top of that acoustic pressure shock waves do not produce byproducts that can have any environmental detrimental impact.

In U.S. Pat. Nos. 5,273,766, 5,328,403, 6,168,814, and 6,224,476 acoustic pressure shock waves were described to be used for tenderizing and sterilization of processed batches of meat (grinded meat or meat slurry). The explosion principle or electrohydraulic principle were used to produce acoustic pressure shock waves that are described into these patents. The meat slurry was directly spread on the acoustic pressure reflector or circulated to pipes in front of the acoustic pressure shock waves. However, the proposed embodiments are difficult to apply in practice, are time consuming, and do not deal with full animal meat/carcasses of animals that require cleaning and decontamination. The elimination of animal meat/carcasses contamination will reduce significantly the possibility of bacterial contamination down the line towards the final stages of processing and packaging of the meat slurry, where these cited patents are used for meat decontamination and tenderizing.

U.S. Pat. No. 9,095,632 describes the methods that employ acoustic pressure shock waves to decontaminate and tenderize the portioned meat slices/steaks, which are packed in vacuum bags. This patent also deals with the final stages of the meat processing and not with the whole animal meat/carcasses prior to be cutting up as portioned meat, as presented into this patent.

SUMMARY OF THE INVENTION

Acoustic pressure shock waves produce strong compressive forces and cavitation that can be used to destroy such contaminating microorganism, without triggering a mutation mechanism. In addition, acoustic pressure shock waves do not produce byproducts that result in environmental detrimental impact.

This invention applies to the processing of animal carcasses to be cut up as meats, including cattle, bison, buffalo, moose, deer, elk, yak, lama, camel, goat, rabbit, donkey, horse, sheep, kangaroo, pig, chicken, duck, goose, turkey, quail, pigeon, ostrich, emu, alligator, crocodile, turtle, fish, crustaceans and mollusks, and other edible meats.

For the meat processing, the cleaning is done with acoustic pressure shock waves created in liquids or air and then transmitted through a liquid or liquid mist or air environment towards the targeted animal meat/carcass.

It is an objective of the present inventions to provide acoustic pressure shock waves generating devices that are modular and do not need high maintenance.

It is a further objective of the present inventions to provide different methods of generating focused, unfocused, planar, pseudo-planar, or radial acoustic pressure shock waves for cleaning animal meat/carcasses, using specific devices that include an acoustic pressure shock wave generator or generators, such as for example:

electrohydraulic generators using spark gap high voltage discharges (as an example see FIG. 6A, FIG. 7, FIG. 8, FIG. 10, and FIG. 11A)

electrohydraulic generators using one or multiple laser sources (as an example see FIG. 6B and FIG. 11B)

piezoelectric generators using piezo crystals (as an example see FIG. 6C and FIG. 11C)

piezoelectric generators using piezo fibers (as an example see FIG. 6D and FIG. 11C)

electromagnetic generators using a flat coil and an acoustic lens (as an example see FIG. 6E)

electromagnetic generators using a cylindrical coil (as an example see FIG. 6F and FIG. 11D)

It is a further objective of the present inventions to provide a means of controlling the energy used for cleaning animal meat/carcasses via the amount of energy generated from the acoustic pressure shock wave generators (energy setting), total number of the acoustic pressure shock waves/pulses, repetition frequency of the acoustic pressure shock waves, and special construction of the reflectors used in the acoustic pressure shock wave applicators.

It is a further objective of the present inventions to provide a variety of novel acoustic pressure shock wave applicator constructions for cleaning animal meat/carcasses, determined by the specific reflector shape, and their capability to guide or focus acoustic pressure shock waves on a specific direction, as schematically is shown in FIG. 2.

DETAILED DESCRIPTION OF THE INVENTION

Embodiments of the invention will be described with reference to the accompanying figures, wherein like numbers represent like elements throughout. Further, it is to be understood that the phraseology and terminology used herein is for description and should not be regarded as limiting. The use of "including", "comprising", or "having" and variations thereof herein is meant to encompass the items listed thereafter and equivalents thereof as well as additional items. The terms "connected", and "coupled" are used broadly and encompass both direct and indirect mounting, connecting, and coupling. Further, "connected" and "coupled" are not restricted to physical or mechanical connections or couplings.

The term liquid means water, water mixtures, colloidal solutions, liquid chemical compounds, or any other fluids or combinations of fluids with other substances that can be used to generate or propagate acoustic pressure shock waves or acoustic pressure waves.

The inventions summarized herein and defined by the enumerated claims are better understood by referring to the following detailed description, which is preferably read in conjunction with the accompanying drawing/figure. The detailed description of a particular embodiment, is set out to enable one to practice the invention, it is not intended to limit the enumerated claims, but to serve as a particular example thereof.

Also, the list of embodiments presented in this patent is not an exhaustive one and for those skilled in the art, new applications can be found within the scope of the invention. The embodiments used in general to clean animal meat/carcasses are further described in detail in the following paragraphs.

Figure 1:
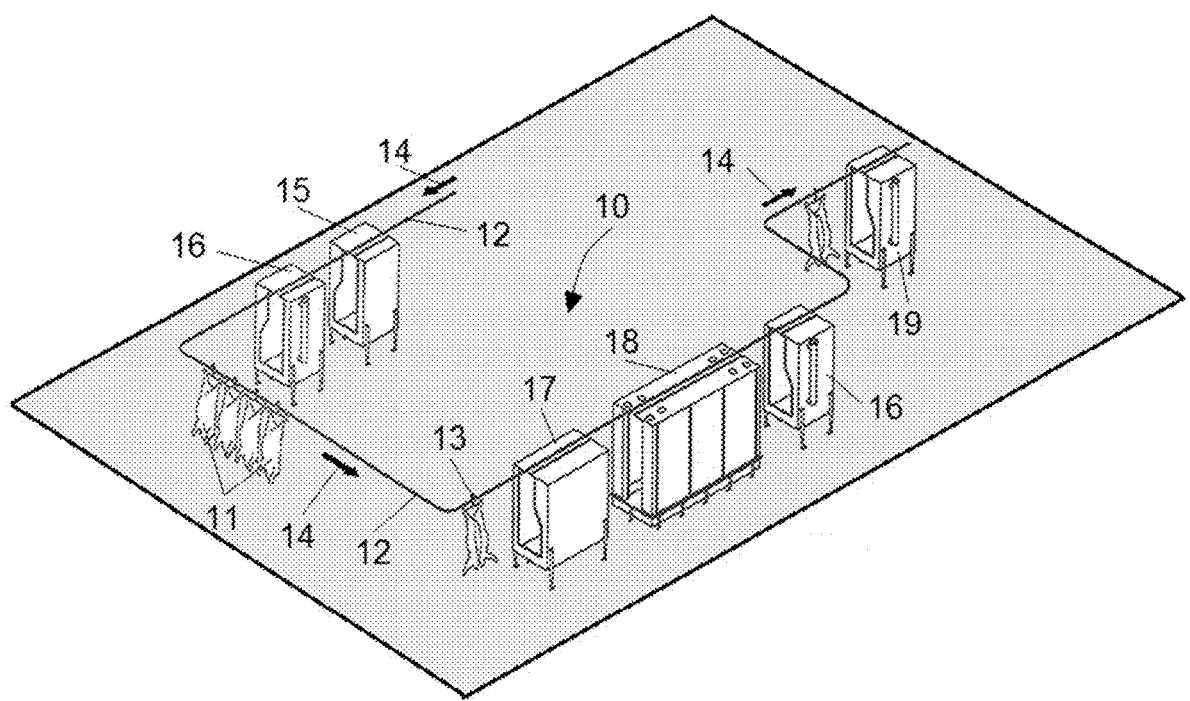
FIG. 1 is a schematic representation of an animal meat/carcasses processing set-up.

FIG. 1 presents the existing animal meat/carcasses cleaning process layout 10. The animal meat/carcasses 11 are anchored via pulley/hook 13 on the moving chain 12 that brings animal meat/carcasses 11 to different processing stations, during their cleaning phase. The travel direction 14 is designed in such way that the animal meat/carcasses 11 after their deskinning (not shown) go through a water wash station 15 followed by an organic acid spray station 16. The water wash station 15 is used to clean any gross contaminates as hair, dirt, etc., from the surface of the animal meat/carcasses 11. The organic acid spray station 16 uses acid spray for killing any bacteria or contaminating microorganisms present on the animal meat/carcasses 11. In this case acids/sanitizers/chemicals mixed with water jets/sprays/showers/mist are used to clean the animal meat/carcasses in these specially-designed cabinets. Naturally, after using acid the animal meat/carcasses 11 need to be washed again at final wash station 17, where the final residues of contaminants or organic acid are eliminated. After that the animal meat/carcasses 11 are going through the hot water animal meat/carcass pasteurization station 18 and another light organic acid cleaning in the second organic acid spray station 16. The last step is the freezing of the animal meat/carcasses 11 when they run through the cold animal meat/carcass pasteurization station 19.

This extensive use of acids/sanitizers/chemicals into the cleaning process of the animal meat/carcasses 11 poses some health and environmental challenges. The questions are about how the concentration of acids/sanitizers/detergents/chemicals, their temperature, and duration of contact with animal meat/carcasses 11, their acidity and alkalinity that will influence the meat and ultimately the health of the consumer. Also, these acids/sanitizers/detergents/chemicals are highly corrosive on metals at high temperatures and certain resultant compounds are undesirable, which can produce health hazard to the factory workers and ultimately to the consumers. Furthermore, after cleaning process of the animal meat/carcasses 11, the residual liquids that contain contaminants and acids/sanitizers/detergents/chemicals need to be stored in special designed ponds and cleaned using secondary processes, which can be costly, and significantly contributing to the environment pollution. Another important aspect that needs to be mentioned is that for both cleaning and sanitizing agents that involves acids/sanitizers/detergents/chemicals it was demonstrated that in time microorganisms mutate and practically are no longer susceptible to the action of acids/sanitizers/detergents/chemicals. A lot of these concerns can be alleviated by using the acoustic pressure shock waves for the cleaning of the animal meat/carcasses 11, which can be done without employing any acids/sanitizers/detergents/chemicals.

The acoustic pressure shock waves produced by the proposed embodiments will have a compressive phase (produces high compressive pressures) and a tensile phase (produces cavitation bubbles that collapse with high speed jets in the sub-millimeter range of action) during one cycle of the acoustic pressure shock waves. These two synergetic effects work in tandem, enhancing the acoustic pressure shock waves effects.

The acoustic pressure shock wave pulses incorporate frequencies ranging from 100 kHz to 20 MHz and will generally have a repetition rate of 1 to 20 Hz. The repetition rate is limited by cavitation, which represents the longest time segment (hundreds to thousands of microseconds) of the pressure pulse produced by acoustic pressure shock waves. To avoid any negative influence of new in-coming pulse, cavitation bubbles need sufficient time to grow to their maximum dimension and then collapse with high speed jets that have velocities of more than 100 m/s. These jets, together with unidirectional nature of pressure fronts/forces created by acoustic pressure shock waves, play an important role in unidirectional actions on the animal meat/carcasses 11. If acoustic pressure shock wave pulses have a high repetition rate that can produce interference in between subsequent shock wave pulses, which negatively can affect the cavitation period, hence reducing the acoustic pressure shock waves desired effects.

Figure 2:
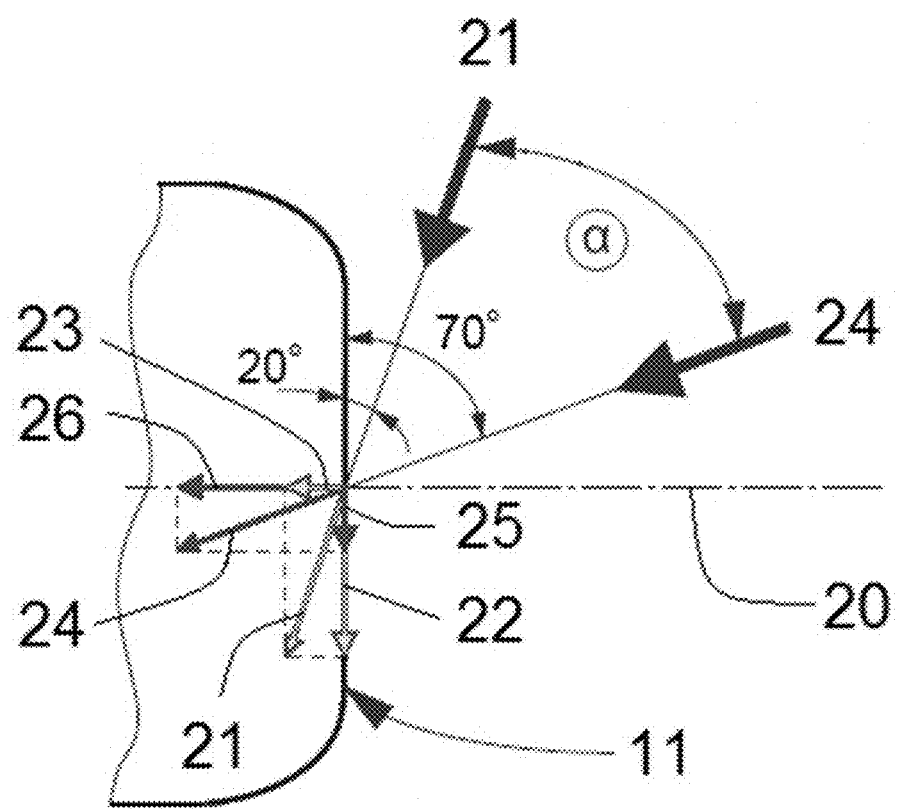
FIG. 2 is a schematic representation of the influence of acoustic pressure shock wave propagation direction on the forces produced by shock waves on an animal meat/carcass.

The acoustic pressure shock waves direction relatively to the surface of the animal meat/carcasses 11 plays an important role in the way the action of the acoustic pressure shock waves is applied during the cleaning process. According to FIG. 2, the direction used for focusing the acoustic pressure shock waves should be done at an optimal angle α in between 20°-70° relatively to the surface of the animal meat/carcasses 11. In this way the pressure/force produced by acoustic pressure shock waves splits into two force components at the surface of the animal meat/carcasses 11. One pressure/force component will be tangential to the surface of the animal meat/carcasses 11 and the other pressure/force component will be perpendicular to the surface of the animal meat/carcasses 11, along the axis perpendicular to animal meat/carcass surface 20. Relatively to the animal meat/carcass 11 surface, the 20°-angle shock wave pressure/force 21 splits into the pressure/shock wave force 21 tangential component 22 and the pressure/shock wave force 21 perpendicular component 23. Correspondingly, the 70°-angle shock wave pressure/force 24 splits into the pressure/shock wave force 24 tangential component 25 and the pressure/shock wave force 24 perpendicular component 26. When the pressure/force components' actions are analyzed for each direction, interesting conclusions can be drawn. The tangential pressure/force component along the surface of the animal meat/carcasses 11 can help with removing of contaminants from the surface of the animal meat/carcasses 11. The 20°-direction relatively to the surface of the animal meat/carcasses 11 can create greater tangential force component when compared to the 70°-direction. The normal/perpendicular pressure/force components acting perpendicular to the animal meat/carcasses 11 can stress the structural integrity of different contaminants. In this case, the 20°-direction relatively to the surface of the animal meat/carcasses 11 can create smaller perpendicular force component when compared to the 70°-direction. The cavitational micro jets produced by the cavitational bubbles will also be directed towards the surface of the animal meat/carcasses 11, which due to their sub-millimeter action will be able to breach the integrity of different contaminating microorganisms from the surface of the animal meat/carcasses 11. The combined action of tangential force component, normal force component, and cavitational jets will ensure a thorough cleaning of the animal meat/carcasses 11 surface. Depending on each specific cleaning situation, the direction of the acoustic pressure shock waves can be set at different angles or in other situations can be continuously moving in between 20 and 70 degrees. The angle change can be accomplished by employing a motorized swiveling motion "S" of the acoustic pressure shock waves around a fixed point (see embodiments for FIG. 6A, FIG. 6B, FIG. 6C, FIG. 6D, FIG. 6E, FIG. 6F, FIG. 7, and FIG. 8).

Figure 3:
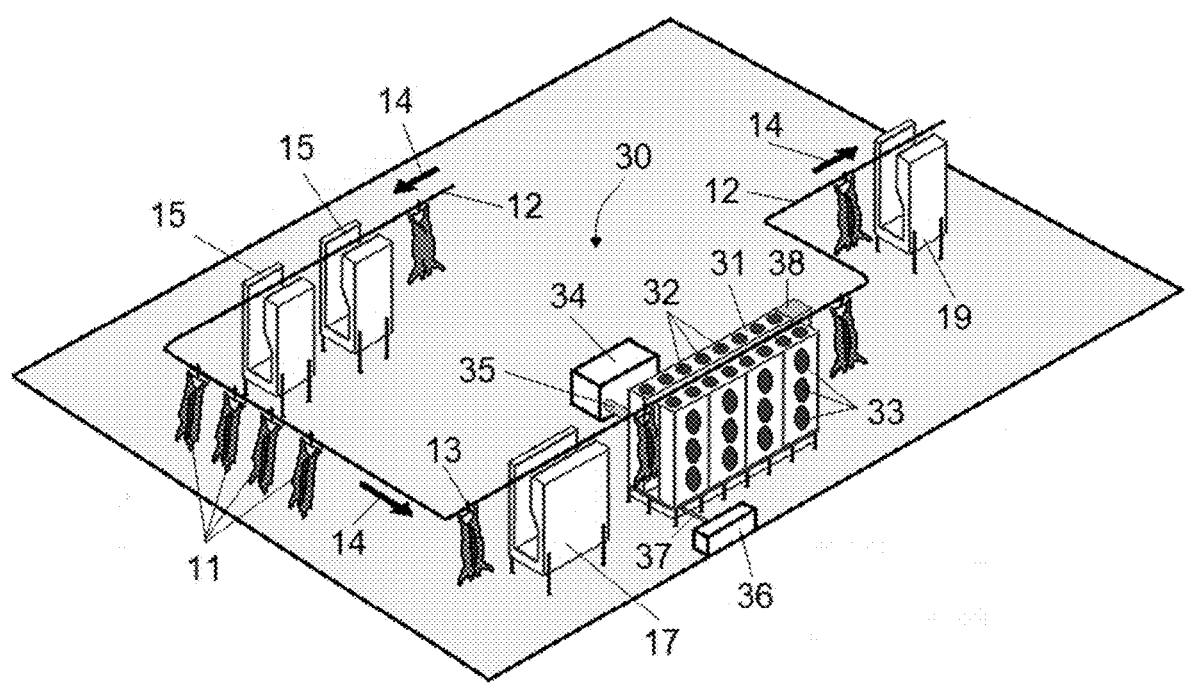
FIG. 3 is a schematic representation of application of acoustic pressure shock waves for the cleaning of animal meat/carcasses in a liquid mist cabinet, according to one embodiment of the present invention.

FIG. 3 is presents a shock wave animal meat/carcass cleaning process 30. The shock wave cleaning station 31 is generating the acoustic pressure shock waves that are used to clean the animal meat/carcasses 11. There are multiple top shock wave applicators 32 and multiple lateral shock waves applicators 33 that are incorporated into the lateral walls and the top portion of the shock wave cleaning station 31. These applicators can be set at different angles or can be continuously moving in between 20° and 70° via a motorized swiveling motion S around a fix point, as presented in embodiments from FIG. 6A, FIG. 6B, FIG. 6C, FIG. 6D, FIG. 6E, FIG. 6F, FIG. 7, and FIG. 8 (this feature is not specifically shown in FIG. 3). To apply acoustic pressure shock waves to a larger portion of the animal meat/carcasses 11, the applicators can also have a motorized translational motion "T" (vertical or lateral depending on applicator's position relatively to the animal meat/carcasses 11), as presented in the embodiments from FIG. 6A, FIG. 6B, FIG. 6C, FIG. 6D, FIG. 6E, FIG. 6F, FIG. 7, and FIG. 8. The applicators can be controlled by a shock wave applicators control station 34 for their concomitantly or subsequently activation, for their functioning parameter adjustment based on the specific cleaning needs, for their independently-controlled possible swiveling S and translational T movements, etc. Even more the shock wave applicators control station 34 can sense the status of the applicators functioning (optimum or not and warns the user), can stop the applicators when no animal meat/carcasses 11 are detected inside the station, match the applicators' firing based on the speed of the moving chain 12, communicate with other stations as the liquid pumping station 36 for optimal functioning, etc.

For the shock wave animal meat/carcass cleaning process 30 presented in FIG. 3, the animal meat/carcasses 11 anchored via pulley/hook 13 on the moving chain 12 are moved in travel direction 14 in such way that the animal meat/carcasses 11 after their deskinning (not shown) go through multiple water wash stations 15 to clean any gross contaminates as hair, dirt, etc., from the surface of the animal meat/carcasses 11. At the final wash station 17, the final wash is used to eliminate residues of contaminants. After final wash station 17 the animal meat/carcasses 11 are going through the shock wave cleaning station 31, where acoustic pressure shock waves produced by the top shock wave applicators 32 and lateral shock waves applicators 33 are used to produce the final decontamination of the animal meat/carcasses 11 from any microorganism, as bacteria, fungus, etc. that can produce spoilage of the meat. Once the animal meat/carcasses 11 are passing through the shock wave cleaning station 31, the cleanliness of the animal meat/carcasses 11 is assessed by the inspection module 38 via optical/imaging methods or any other methods that can be employed to assess the germ-free and cleanliness of the animal meat/carcasses 11. The last step is the freezing of the animal meat/carcasses 11 when they run through the cold animal meat/carcass pasteurization station 19. Being a modular approach, after the shock wave cleaning station 31 and before the cold animal meat/carcass pasteurization station 19, another final wash station 17 or a hot water animal meat/carcass pasteurization station 18 can be added (see FIG. 1). Also, it is feasible to replace some of the water wash stations 15 with other type of stations employing additional technologies that can participate in removing different types of contaminants. Eliminating the use of acids/sanitizers/chemicals into the cleaning process of the animal meat/carcasses 11 by using shock wave cleaning station 31 will significantly reduce the environmental challenges. Furthermore, when acoustic pressure shock waves are used for cleaning animal meat/carcasses 11 that allows a simplified process, reduced pollution, and increased efficiency. Finally, it is important to mention that using acoustic pressure shock waves to clean the animal meat/carcasses 11, represents a process that can work for all types of contaminants and microorganisms/germs without any possibility to create microorganisms' mutations and resistance, as seen when cleaning using acids/sanitizers/detergents/chemicals.

The top shock wave applicators 32 and lateral shock waves applicators 33 can produce acoustic pressure shock waves in air via lasers (see the embodiment from FIG. 6B) that can propagate through air or a liquid mist towards the animal meat/carcasses 11. For high efficiency action of the acoustic pressure shock waves, their reflection at different mediums should be avoided, since when acoustic properties of the propagation medium are changed, reflections of the acoustic pressure shock waves are produced with significant loss of energy. The use of air for acoustic shock waves generation and propagation will significantly reduce or eliminate the consumption of liquids/fluids for the shock wave cleaning station 31. The drawback is that by using acoustic pressure shock wave produced and propagating in air is the elimination of the benefic action of the micro jets produce by the collapse of cavitational bubbles that can be created only in a liquid/fluid environment. The good thing is that the use of acoustic pressure shock waves produced in air and propagating in air might fit better the standard procedures that are currently used especially for large animals' carcasses, where the regulatory agencies do not permit the complete submerging of the animal meat/carcasses 11 in a liquid. However, the pass of small animals' carcasses through liquid/water baths, it is a common procedure used for meat processing. Therefore, in some of the following embodiments the cleaning using acoustic pressure shock waves developed in liquids and propagating through liquids is presented that can use compressive pressures/forces in combination with cavitation bubble collapse micro jets for the cleaning, which produces an "one-two punch" action with increased efficiency of the cleaning process.

In other situations, the embodiment presented in FIG. 3 can be used to produce acoustic pressure shock waves as a supplemental technology used in conjunction with disinfectants for the cleaning of the animal meat/carcasses 11 to produce a better cleaning. However, the addition of acoustic pressure shock waves in the cleaning process can reduce the amount of disinfectants needed for the actual cleaning. This can have important environmental impact for the meat processing plants, by reducing the need for large retention ponds for the contaminated process water. At the extreme no disinfection will be used and just clean water droplets will be sprayed in combination with the use of acoustic pressure shock wave applicators.

The applicators of the shock wave cleaning station 31 are controlled via the shock wave applicators control station 34, which incorporates hardware and software necessary to assure the correct functioning of the applicators used by the shock wave cleaning station 31. The shock wave applicators control station 34 is transmitting commands, electrical signals and power towards the acoustic pressure shock waves applicators via shock wave applicators control station electrical connection 35.

If the propagation of the acoustic pressure shock waves generated in air is done via a liquid mist (air with very small liquid particles) than a liquid pumping station 36 is necessary to be employed. This station will pump the liquid through the liquid pumping station piping connection 37 in the shock wave cleaning station 31 and produce the liquid mist via special designed nozzles (not shown). These nozzles can be fixed or can be motorized to swivel around a pivoting point.

The actual controller of the shock wave applicators control station 34 should include at least a reader, a processor, a display, user input apparatus, and an information storage device. The controller and all its components are not shown/depicted in the FIG. 3. However, the controller and its components are described as structure and functionality. Each of the components may include hardware, software, or a combination of hardware and software configured to perform one or more functions associated with providing good functioning of the acoustic pressure shock wave applicators incorporated into the shock wave applicators control station 34. The one or more components of the controller may be coupled by optical, electrical, wireline or wireless media. In some embodiments, the components may be coupled by such mechanisms via a universal serial bus ("USB") or an RS 232 port. In some embodiments, various components may be located proximate to or remote from other components, and the communication network may be provided for transmitting and receiving information to and from one or more components. In some embodiments, controller and its components therein may also include electromechanical components, which are activated by sophisticated software and hardware components. In one embodiment, controller processes information received by the processor and transmits the information received to the power source 67 (see FIG. 6A, FIG. 6B, FIG. 6C, FIG. 6D, FIG. 6E, FIG. 6F, and FIG. 10) for generating a selected number of shock waves by utilizing a selected amount of energy, as determined by the one or more settings transmitted from the information storage device. The shock wave applicators control station 34 and its associated power source 67 may include hardware or components for providing one or more shock waves by electromechanical, electromagnetic, electrohydraulic, or piezoelectric methods. Timers can provide timing for emitting the one or more generated shock waves at a selected frequency as dictated by the one or more settings.

The reader incorporated into controller of the shock wave applicators control station 34 may be any mechanism configured to read information from information storage device, including, but not limited to, optical character recognition ("OCR") reader, barcode reader, RFID reader or the like.

The controller also has a processor that includes software, hardware or a combination of both software and hardware configured to receive and process information from the real-time functionality of the shock wave applicators control station 34 or information read from information storage device via the reader. In one embodiment, the processor examines the read information from the storage device via the reader (past-history, different functioning protocols, etc.) and generates control information configured to be received by the shock wave applicators control station 34 for optimal functionality. Accordingly, the shock wave applicators control station 34 may receive the control information and be controlled to operate in accordance with one or more of the settings stored on information storage device. In some embodiments, the controller-downloads the functional settings for the shock wave applicators control station 34 from treatment information storage device.

User input apparatus includes software, hardware, or a combination of both software and hardware configured to receive inputs initiated by a user and translate the received inputs to signals disposed to be interpreted by one or more of processor, display, reader, or the shock wave applicators control station 34. In one embodiment, the received inputs are translated into signals configured to cause reader to read and/or scan the information regarding functionality of the shock wave applicators control station 34 on the information storage device. In another embodiment, the received inputs are translated into signals configured to cause a mechanism to write to the information storage device. In yet another embodiment, the received inputs are translated into signals configured to control the applicator functionality parameters (energy setting, frequency, and total number of shock waves).

The display includes software, hardware or a combination of both software and hardware configured to receive and format for visual display of image information indicative of one or more functional parameters settings read by reader. The visual display may be graphical, pictorial, text or otherwise. In one embodiment, the display may be able to display the information at different angles that the applicators are set relatively to the animal meat/carcasses 11 surface. In one embodiment, display may be a graphical user interface ("GUI"). The GUI may be a touchscreen GUI or a GUI configured to receive signals from inputs received at user input apparatus for the correct functionality of the shock wave applicators control station 34 and its components. In one embodiment, the display displays operational instructions readable by personnel operating the shock wave applicators control station 34. In another embodiment, instructions may be provided for performing one or more of: initializing the controller or the shock wave applicators control station 34; loading operational settings; loading necessary information indicative of the type of setting; or starting procedure for the shock wave applicators control station 34. Display may output the speed of the processing line, applicator type, applicator life remaining before service, selected functional settings, type of cleaning (large carcasses or smaller carcasses, etc.), date and/or time of the cleaning, etc. The display may also display an image of the area from inside the shock wave applicators control station 34, to assess the action of the acoustic pressure shock waves on the animal meat/carcasses 11 surface.

The controller may also include a system functioning information storage device. The system functioning information storage device may have information stored thereon for performing one or more functions related to providing good functioning of the shock wave applicators control station 34. By way of example, but not limitation, system functioning information storage device may be an RFID tag, a chip, memory stick, smart card, floppy disk, CD-ROM, digital versatile disk ("DVD") or any device configured to store information and from which information may be read.

The actual controller for the shock wave applicators control station 34, and all the other possible stations mentioned in this specification, should be a rugged design capable of sustaining the dirty, corrosive, inflammable, and harsh environment in which they are supposed to function.

Figure 12:
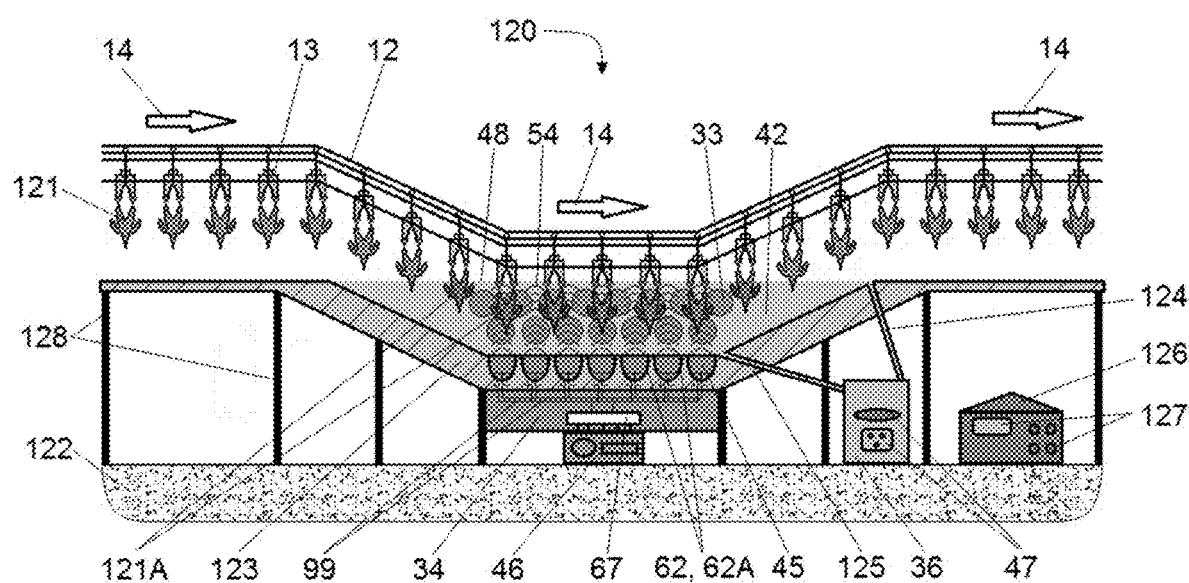
FIG. 12 is a schematic representation of application of acoustic pressure shock waves for the cleaning of small animal carcasses in a dedicated liquid tank, according to one embodiment of the present invention.

It is important to mentioned that throughout this patent other control stations are shown, and they are also having a controller associated with them that have similar basic function and structure as the one described for the shock wave applicators control station 34. Examples of such stations are the following:

Liquid pumping station 36 (see FIG. 3)
Shock wave mini-tanks conveyor control station 57 (see FIG. 5)
Shock wave mini-tanks vertical movement control station 58 (see FIG. 5)
Clean liquid drape control station 93 (see FIG. 9)
Contaminated liquid pumping station 97 (see FIG. 9)
Chain moving station 126 (see FIG. 12)

Figure 4:
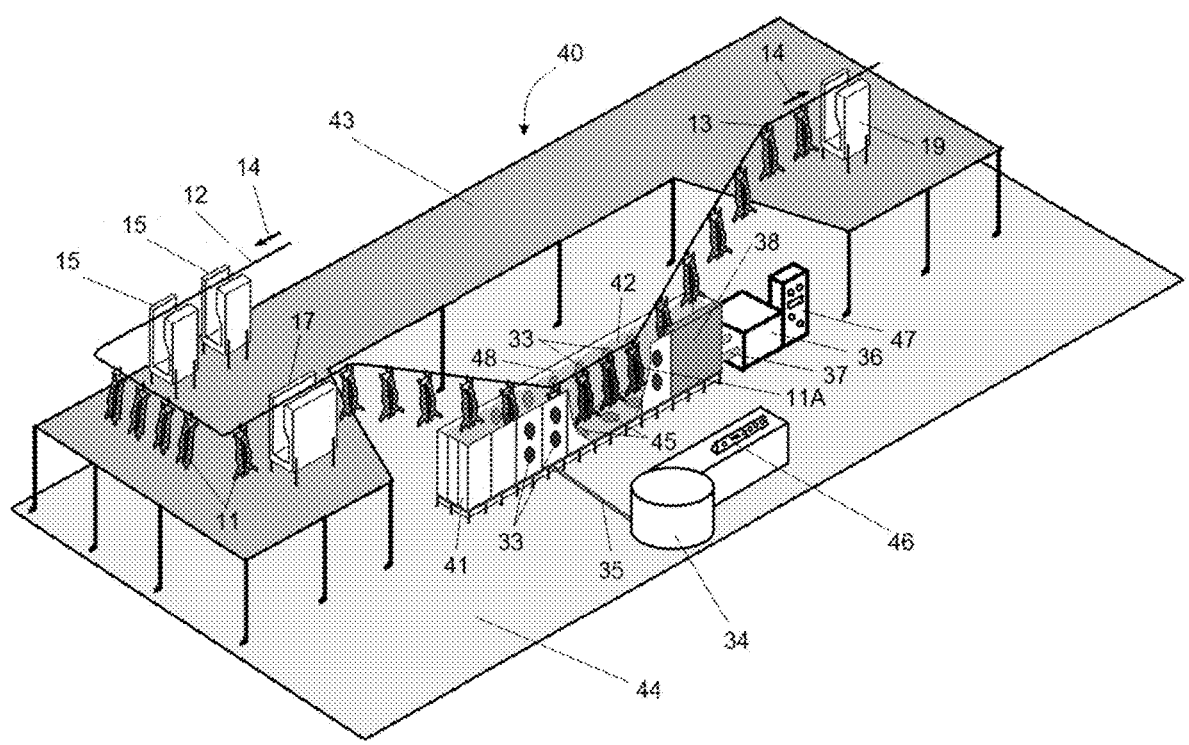
FIG. 4 is a schematic representation of application of acoustic pressure shock waves for the cleaning of animal meat/carcasses in a dedicated large liquid tank, according to one embodiment of the present invention.

FIG. 4 presents the shock wave tanks cleaning process 40 that includes producing acoustic pressure shock waves in a liquid which then propagate through a liquid towards the animal meat/carcasses 11 surface. Generation and propagation of the acoustic pressure shock waves through the same type of medium (in this case liquid) will increase their efficiency, by avoiding the loss of energy at the interface of different mediums and allow the use of their full potential for the cleaning of the animal meat/carcass 11. The animal meat/carcass processing shock wave tank 41 is introduced in the normal animal meat/carcass 11 process flow, as the main way to clean contaminants and pathogens. The cleaning action of the acoustic pressure shock waves is produced by the high compressive forces generated in the compressive phase of the shock waves and by the micro jets produced during collapse of the cavitation bubbles created during the tensile phase of the shock waves in the shock wave propagating liquid 42. This produces an "one-two punch" action during cleaning of the animal meat/carcass 11, when acoustic pressure shock waves are used, which gives an increased efficiency to the cleaning process.

To produce a complete cleaning of the animal meat/carcasses 11, the animal meat/carcass processing shock wave tank 41 will need to have multiple lateral shock waves applicators 33 and bottom shock waves applicators 45. These applicators produce acoustic pressure shock waves in a liquid and then propagate them through the shock wave propagating liquid 42 of the animal meat/carcass processing shock wave tank 41 towards the targeted liquid-submerged animal meat/carcass 11A. To control the proper functionality of both lateral shock waves applicators 33 and bottom shock waves applicators 45, a shock wave applicators control console 46 is used. The controller associated with shock wave applicators control console 46 has similar basic function and structure as the one described for the shock wave applicators control station 34 from FIG. 3. The shock wave applicators control console 46 is an integral part of the shock wave applicators control station 34 and it is transmitting commands, electrical signals, and power towards the acoustic pressure shock waves applicators 33 and 45 via shock wave applicators control station electrical connection 35. Furthermore, the shock wave applicators control console 46 is controlling the lateral acoustic pressure shock wave applicators 33 and bottom acoustic pressure shock wave applicators 45 for their concomitantly or subsequently activation, their functioning parameter adjustment based on the specific cleaning needs, and for their independently-controlled swiveling S and translational T movements (see FIG. 6A, FIG. 6B, FIG. 6C, FIG. 6D, FIG. 6E, FIG. 6F, FIG. 7, and FIG. 8), etc. Even more the shock wave applicators control console 46 can sense the status of the applicators functioning (optimum or not and warns the user), can stop the applicators when no animal meat/carcasses 11 are detected inside the meat/carcass processing shock wave tank 41, match the applicators' firing based on the speed of the moving chain 12, communicate with other stations as the liquid pumping station 36 for optimal functioning, etc.

The cleanliness for shock wave propagating liquid 42 and the optimum liquid level 48 from the animal meat/carcass processing shock wave tank 41 are maintained and controlled by the liquid pumping station 36. The liquid pumping station piping connection 37 assures the transfer of liquid in between the animal meat/carcass processing shock wave tank 41 and liquid pumping station 36. The liquid from the large animal meat/carcass processing shock wave tank 41 needs to be cleaned and filtrated periodically to avoid cross contamination. The best solution is a continuous flow of fresh liquid to avoid cross contamination of the surface of the animal meat/carcasses 11. The liquid pumping station control console 47 is used to input parameters, monitor functionality of the liquid pumping station 36, controls the liquid quantity and quality (freshness and cleanness), its filtration, discards soiled liquid in special designed tanks, and houses an electronic controller, which has similar basic function and structure, as the one described for the shock wave applicators control station 34 from FIG. 3.

For the shock wave tanks cleaning process 40 presented in FIG. 4, the animal meat/carcasses 11 anchored via pulley/hook 13 on the moving chain 12 are moved in travel direction 14 in such way that the animal meat/carcasses 11 after their deskinning (not shown) go through multiple water wash stations 15 to clean any gross contaminates as hair, dirt, etc., from the surface of the animal meat/carcasses 11. At the final wash station 17, the final wash is used to eliminate residues of contaminants. After final wash station 17 the animal meat/carcasses 11 are dropped from the upper platform 43 towards the lower platform 44 and inside the animal meat/carcass processing shock wave tank 41, where acoustic pressure shock waves produced by the lateral shock waves applicators 33 and the bottom shock wave applicators 45 are used to produce the final decontamination of the liquid-submerged animal meat/carcass 11A from any microorganisms, as bacteria, funguses, etc. that can produce spoilage of the meat. Once the liquid-submerged animal meat/carcass 11A are passing through the animal meat/carcass processing shock wave tank 41, the cleanliness of the animal meat/carcasses 11 is assessed by the inspection module 38 via optical/imaging methods or any other methods that can be employed to assess the germ-free and cleanliness of the animal meat/carcasses 11. The liquid-submerged animal meat/carcass 11A move out of the animal meat/carcass processing shock wave tank 41 and towards the upper platform 43. The last step is the freezing of the animal meat/carcasses 11 when they run through the cold animal meat/carcass pasteurization station 19 placed on the upper platform 43. The modular approach of the cleaning process using shock wave tanks 40, facilitates the possibility to use, after the animal meat/carcass processing shock wave tank 41 and before the cold animal meat/carcass pasteurization station 19, of another final wash station 17 or a hot water animal meat/carcass pasteurization station 18 (see FIG. 1). Also, it is feasible to replace some of the water wash stations 15 with other type of stations employing additional technologies that can participate in removing different types of contaminants. Eliminating the use of acids/sanitizers/chemicals into the cleaning process of the animal meat/carcasses 11 by using the animal meat/carcass processing shock wave tank 41 will significantly reduce the environmental challenges. Furthermore, when acoustic pressure shock waves are used for cleaning animal meat/carcasses 11 that allows a simplified process, reduced pollution, and increased efficiency.

This is a process that can work for all types of contaminants and microorganisms/germs without any possibility to create microorganisms' mutations and resistance, as seen when cleaning using acids/sanitizers/detergents/chemicals.

It is interesting to note that in FIG. 3 and FIG. 4 for the animal meat/carcasses 11 cleaning one can use one, two, or multiple shock wave cleaning stations 31 or animal meat/carcass processing shock wave tanks 41 placed in serial faction, for improved efficiency of the cleaning process using acoustic pressure shock waves.

Figure 5:
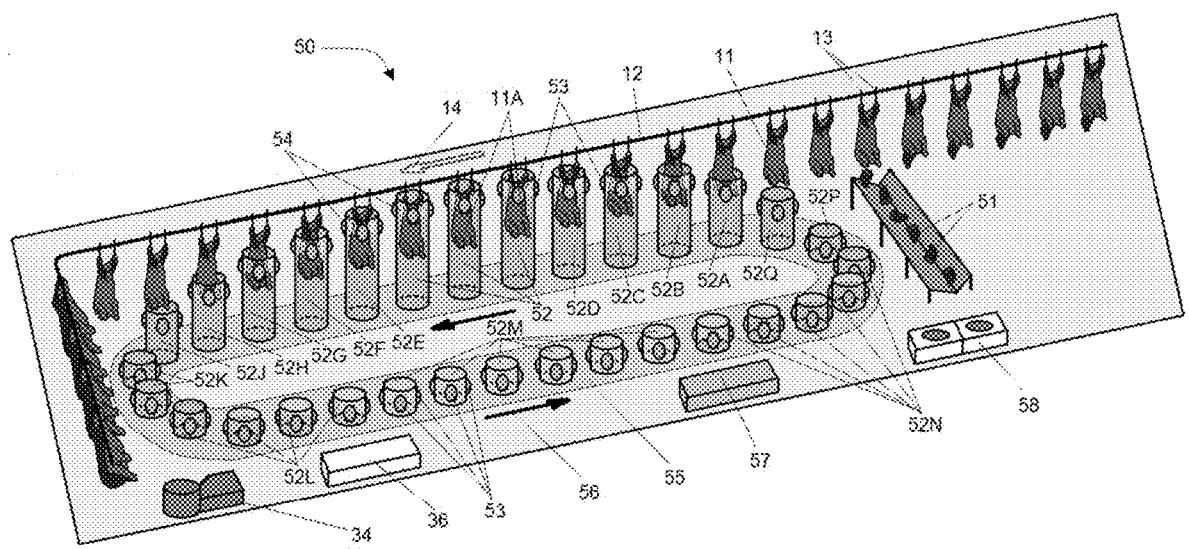
FIG. 5 is a schematic representation of application of acoustic pressure shock waves for the cleaning of animal meat/carcasses in a conveyer type system that uses individualized liquid-filled cylindrical mini-tanks for each carcass, according to one embodiment of the present invention.

The embodiment from FIG. 5 presents a single animal meat/carcass shock wave mini-tanks cleaning process 50. Practically, in the normal flow of the meat processing plant was incorporated a specially designed "O"-shaped shock wave mini-tanks conveyor 55 that contains and moves cylindrical mini-tanks used for the cleaning of individual animal meat/carcasses 11. The shock wave mini-tanks conveyor travel direction 56 coincides with the travel direction 14 of the animal meat/carcasses 11 through the processing line. Furthermore, the shock wave mini-tanks conveyor travel direction 56 matches the speed of the travel direction 14 for the animal meat/carcasses 11, to perfectly align the mini-tanks with the animal meat/carcasses 11. The control of the shock wave mini-tanks conveyor 55 is done by shock wave mini-tanks conveyor control station 57 that has an electronic controller, which has similar basic function and structure as the one described for the shock wave applicators control station 34 from FIG. 3. The mini-tanks have at their upper portion four (4) mini-tank shock wave applicators 53 that are used for cleaning/disinfection of the animal meat/carcasses 11. The control of the mini-tank shock wave applicators 53 is done by the shock wave applicators control station 34, whose functions and structural components were presented in detail in FIG. 3.

The mini-tanks correctly aligned with the animal meat/carcasses 11 also need to be gradually raised in the vertical direction to allow the four (4) mini-tank shock wave applicators 53 to swipe the whole height of the animal meat/carcasses 11 during the cleaning process. The control of the shock wave mini-tanks raising and dropping during the cleaning process is done by the shock wave mini-tanks vertical movement control station 58, which has an electronic controller that has similar basic function and structure as the one described for the shock wave applicators control station 34 from FIG. 3. The horizontal movement along the processing line and the vertical movement of the mini-tanks need to be perfectly coordinated to accomplish the desired cleaning results.

To produce proper acoustic pressure shock waves 54 in a liquid the mini-tanks must be filled during the cleaning process with fresh and clean liquid. The control of the liquid is done via the liquid pumping station 36, which has an electronic controller that has similar basic function and structure as the one described for the shock wave applicators control station 34 from FIG. 3. The functionality of the liquid pumping station 36 is alike the one described for FIG. 4. It is important to note that during the raising of the mini-tanks the liquid pumping station 36 puts clean and fresh liquid inside the tank, in coordination with the upwards movement controlled by the shock wave mini-tanks vertical movement control station 58. During the dropping stage of the mini-tanks, similarly the same coordination happens in between the liquid pumping station 36 and the shock wave mini-tanks vertical movement control station 58. In this stage the liquid pumping station 36 is pulling out dirty and contaminated liquid out of the mini-tanks without compromising the acoustic pressure shock waves cleaning action. The dirty and contaminated liquid being filtrated or refreshed for the next cleaning cycle step of the liquid processing is not specifically shown in FIG. 5.

To start the cleaning process of the animal meat/carcasses 11 the mini-tanks are raised from the floor, filled with fresh and clean liquid, and perfectly aligned with the animal meat/carcasses 11. In the same time the four (4) mini-tank shock wave applicators 53 are started. The tank upward movement it is slow, which allows the treatment of the animal meat/carcass 11 with acoustic pressure shock waves 54 through the entire height of the animal meat/carcasses 11. Therefore, in FIG. 5, the first mini-tank where the animal meat/carcass 11 without the animal's head 51 is getting inside the mini-tank is represented by the partially-raised shock wave mini-tank for cleaning starting 52A. This mini-tank is filled with fresh and clean liquid and cleaning with the acoustic pressure shock wave 54 starts. The raising of the tank continues, and the next mini-tank is the partially-raised shock wave mini-tank for cleaning animal meat/carcass lower part 52B, where the lower part of the animal meat/carcasses 11 is cleaned. For each mini-tank, the four (4)

mini-tank shock wave applicators 53 continue to be raised together with the mini-tanks, which is the case with the partially-raised shock wave mini-tank for cleaning animal meat/carcass middle part 52C, where the middle part of the animal meat/carcasses 11 is cleaned. The cleaning process continues with the partially-raised shock wave mini-tank for cleaning animal meat/carcass upper part 52D, where the upper part of the animal meat/carcasses 11 is cleaned. In the next mini-tank the whole animal meat/carcass is completely submerged in liquid in the fully-deployed shock wave mini-tank 52. To ensure a thorough cleaning in the most upper position of the four (4) mini-tank shock wave applicators 53 there are at least three consecutive fully-deployed shock wave mini-tank 52 on the shock wave mini-tanks conveyor 55. In these mini-tanks, the liquid-submerged animal meat/carcass 11A is subjected to the four (4) mini-tank shock wave applicators 53 that are producing acoustic pressure shock waves 54 targeting the hind legs that are used to hang the animal meat/carcass 11 to the transportation/moving chain 12 via the pulleys/hooks 13. Afterwards, the cylindrical mini-tanks are gradually retrieved into the shock wave mini-tanks conveyor 55 floor. Thus, the partially-dropped shock wave mini-tank for cleaning animal meat/carcass upper part 52E is the first mini-tank that starts to drop and by doing that the four (4) mini-tank shock wave applicators 53 have a second pass on the cleaning of the animal meat/carcass 11 in a downward direction. The dropping and cleaning process with acoustic pressure shock waves continues with the subsequent mini-tanks—the partially-dropped shock wave mini-tank for cleaning animal meat/carcass middle part 52F, the partially-dropped shock wave mini-tank for cleaning animal meat/carcass lower part 52G, and the partially-dropped shock wave mini-tank for finishing animal meat/carcass cleaning 52H. At this point, the cleaning with acoustic pressure shock waves 54 is finished. Subsequently, the cleaned animal meat/carcass 11 is completely out of the cylindrical mini-tank as seen in the case of the dropping shock wave mini-tank after animal meat/carcass cleaning 52J. The dropping of the mini-tanks continues until the mini-tanks a fully-dropped as illustrated by the fully-dropped shock wave mini-tanks 52K. On the return cycle of the shock wave mini-tanks conveyor 55, the dirty and contaminated liquid is continuously drained from completely dropped mini-tanks, as seen for the partially-drained shock wave mini-tanks 52L. This process continues until the dirty and contaminated liquid is completely drained from the cylindrical mini-tanks. Afterwards, these fully-drained shock wave mini-tanks 52M go through a cleaning process of their own, performed using light chemicals or steam, during the nonstop movement of the shock wave mini-tanks conveyor 55. With that being done, the completely-dropped mini-tanks are ready to receive fresh and clean liquid for starting the re-filling process, as illustrated in the partially-filled shock wave mini-tanks with fresh liquid 52N until the fully-dropped mini-tanks are completely-filled with fresh and clean liquid, as seen for the fully-filled shock wave mini-tank with fresh liquid 52P. At this point, the raising cycle of the mini-tanks starts again and the partially-raised shock wave mini-tank and fully-filled with fresh liquid 52Q is ready for receiving an animal meat/carcass 11 to start over a new cleaning cycle using acoustic pressure shock waves 54.

For the embodiment presented in FIG. 5, the acoustic pressure shock waves 54, used for cleaning of the animal meat/carcasses 11, can be focused or unfocused, based on the specific construction of the shock wave devices and the precise needs during cleaning process.

The cleanliness of the animal meat/carcasses 11 after the single animal meat/carcass shock wave mini-tanks cleaning process 50 is assessed by an inspection module like the inspection module 38 from FIG. 3. This inspection module is not specifically shown in FIG. 5. The cleanliness is assessed via optical/imaging methods or any other methods that can be employed to assess the germ-free and cleanliness of the animal meat/carcasses 11.

In the embodiments presented in FIG. 6A, FIG. 6B, FIG. 6C, FIG. 6D, FIG. 6E, and FIG. 6F, the acoustic pressure shock waves 54 (schematically shown in FIG. 4) are generated via different principles, which changes their characteristics and output when they are used for the cleaning of the animal meat/carcasses 11. Any of these embodiments can be used in the construction of the shock wave cleaning station 31 from FIG. 3 (incorporates the top shock wave applicators 32 and the lateral shock wave applicators 33), of animal meat/carcass processing shock wave tank 41 from FIG. 4 (incorporates the lateral shock waves applicators 33 and bottom shock wave applicators 45), or of the single animal meat/carcass shock wave mini-tanks cleaning process 50 from FIG. 5 (employs the mini-tank shock wave applicators 53).

Figure 6A:
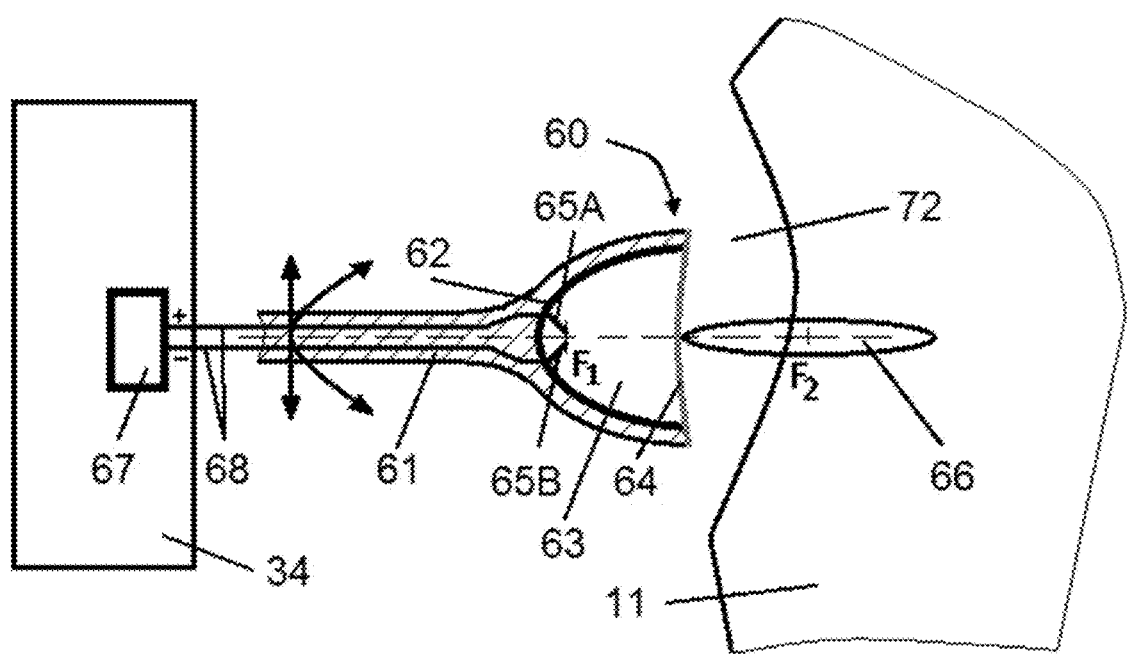
FIG. 6A is a schematic representation of application of acoustic pressure shock waves for the cleaning of animal meat/carcasses via electrohydraulic generators using spark gap high voltage discharges, according to one embodiment of the present invention.

In FIG. 6A the acoustic pressure shock waves 54 (schematically shown in FIG. 5) are generated inside the acoustic pressure shock wave applicator 60, which has an ellipsoidal reflector 62 that resides inside the applicator body 61. An applicator membrane 64 sits at the aperture/opening of the ellipsoidal reflector 62 and thus creating a reflector cavity 63, which is filled with a liquid. The acoustic pressure shock waves 54 (schematically shown in FIG. 5) are produced via high voltage discharge produced in between first electrode 65A and the second electrode 65B at the first focal point $F_1$ (electrohydraulic principle using spark gap high voltage discharges) in a liquid present inside the reflector cavity 63. The high voltage for the first electrode 65A and the second electrode 65B is provided by the power source 67 via cable 68. The power source 67 is an integral part of the shock wave applicators control station 34. The two electrodes are positioned in the first focal point $F_1$ of the ellipsoidal reflector 62 and during their discharge they produce a plasma bubble in the liquid from reflector cavity 63 that expands and collapse transforming the heat into kinetic energy in the form of acoustic pressure shock waves 54 (schematically shown in FIG. 5). This represents the electrohydraulic principle to produce acoustic pressure shock waves 54 (schematically shown in FIG. 5), which are then focused and transmitted in-between applicator and animal meat/carcass space 72 that must be filled with a liquid too, to avoid unnecessary reflections and loss of energy at the interface of different mediums of dissimilar acoustic properties. The focusing of the acoustic pressure shock waves 54 (schematically shown in FIG. 5) is produced by the ellipsoidal reflector 62 towards the focusing point $F_2$ also known as the second focal point of the ellipsoid. However, the focusing is produced in a larger volume known as the focal volume 66 that must intersect the targeted area, which in this case is the surface of the animal meat/carcasses 11. The focused acoustic pressure shock waves 54 (schematically shown in FIG. 5) are very powerful and produce large compressional forces and significant cavitational activity at the surface of the animal meat/carcasses 11.

Figure 6B:
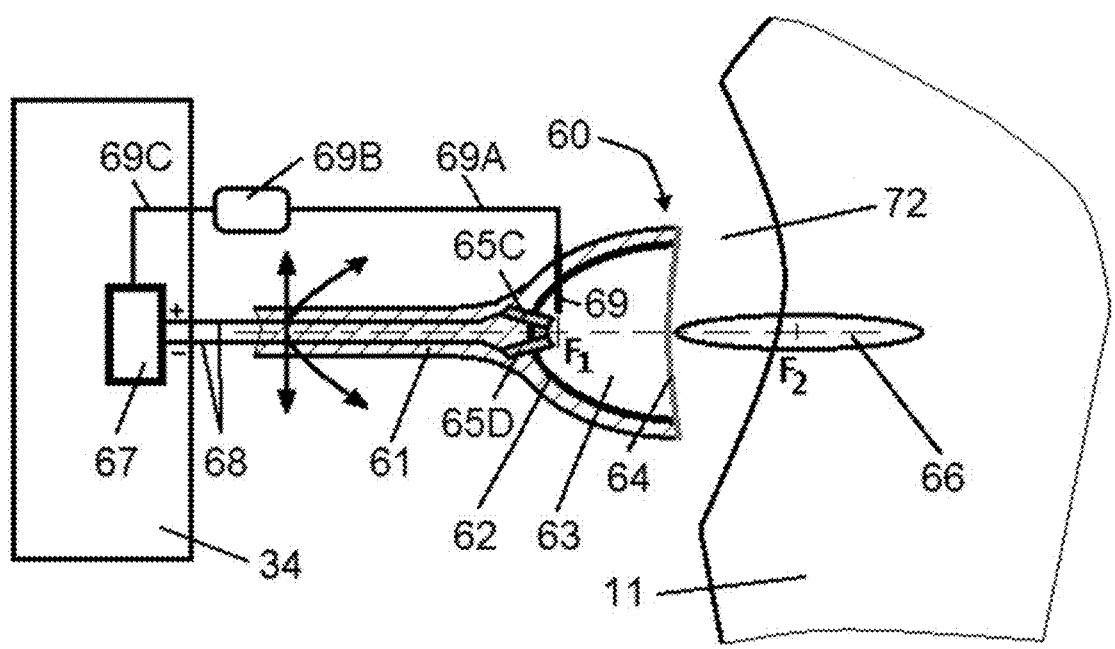
FIG. 6B is a schematic representation of application of acoustic pressure shock waves for the cleaning of animal meat/carcasses via electrohydraulic generators using one or multiple laser sources, according to one embodiment of the present invention.

In FIG. 6B the acoustic pressure shock waves 54 (schematically shown in FIG. 5) are generated via one or multiple laser sources. The acoustic pressure shock waves 54 (schematically shown in FIG. 5) are generated inside the acoustic pressure shock wave applicator 60, which has an ellipsoidal reflector 62 that resides inside the applicator body 61. An applicator membrane 64 sits at the aperture/opening of the ellipsoidal reflector 62 and thus creating a reflector cavity 63, which is filled with a liquid or in some cases only with a gas. When a liquid is used inside the reflector cavity 63, the laser beams produced by first incased laser 65C and the second incased laser 65D are positioned in such way to intersect their beams in the first focal point $F_1$ of the ellipsoidal reflector 62 to produce a plasma bubble in the liquid from reflector cavity 63 that expands and collapse transforming the heat into kinetic energy in the form of acoustic pressure shock waves 54 (schematically shown in FIG. 5). If a gas is used inside the reflector cavity 63, the laser beams produced by first incased laser 65C and the second incased laser 65D must intersect their beams in the first focal point $F_1$ of the ellipsoidal reflector 62 to produce a plasma bubble in the gas, which requires different energy levels and types of lasers when compared to liquid-laser generated acoustic pressure shock waves 54 (schematically shown in FIG. 5). The high voltage for the first incased laser 65C and the second incased laser 65D is provided by the power source 67 via cable 68. The power source 67 is an integral part of the shock wave applicators control station 34. The two laser sources from FIG. 6B include a means of monitoring the system performance by measuring the reaction temperature of the plasma bubble collapse using a method of optical fiber thermometry. An optical fiber tube assembly 69 extends into the $F_1$ region of the ellipsoidal reflector 62. The optical fiber tube assembly 69 transmits (via optical fiber 69A) specific spectral frequencies created from the sonoluminescence of the plasma reaction in the liquid or gas present inside the reflector cavity 63 to the spectral analyzer 69B. The loop is closed via feedback cable 69C that connects the spectral analyzer 69B with the power source 67. Basically, the spectral analysis provided by the spectral analyzer 69B is used to adjust accordingly the power generated by the power source 67, to ensure a proper laser discharge for the incased lasers 65C and 65D. As presented for FIG. 6A, also in this case the acoustic pressure shock waves 54 (schematically shown in FIG. 5) are then focused and transmitted in-between applicator and animal meat/carcass space 72 that must be filled with a liquid (if the acoustic pressure shock waves 54 were generated with lasers in a liquid) or a gas (if the acoustic pressure shock waves 54 were generated with lasers in a gas), to avoid unnecessary reflections and loss of energy at the interface of different mediums of dissimilar acoustic properties. The focusing of the acoustic pressure shock waves 54 (schematically shown in FIG. 5) is produced by the ellipsoidal reflector 62 towards the focal volume 66 that must intersect the targeted area, which in this case is the surface of the animal meat/carcasses 11.

Figure 6C:
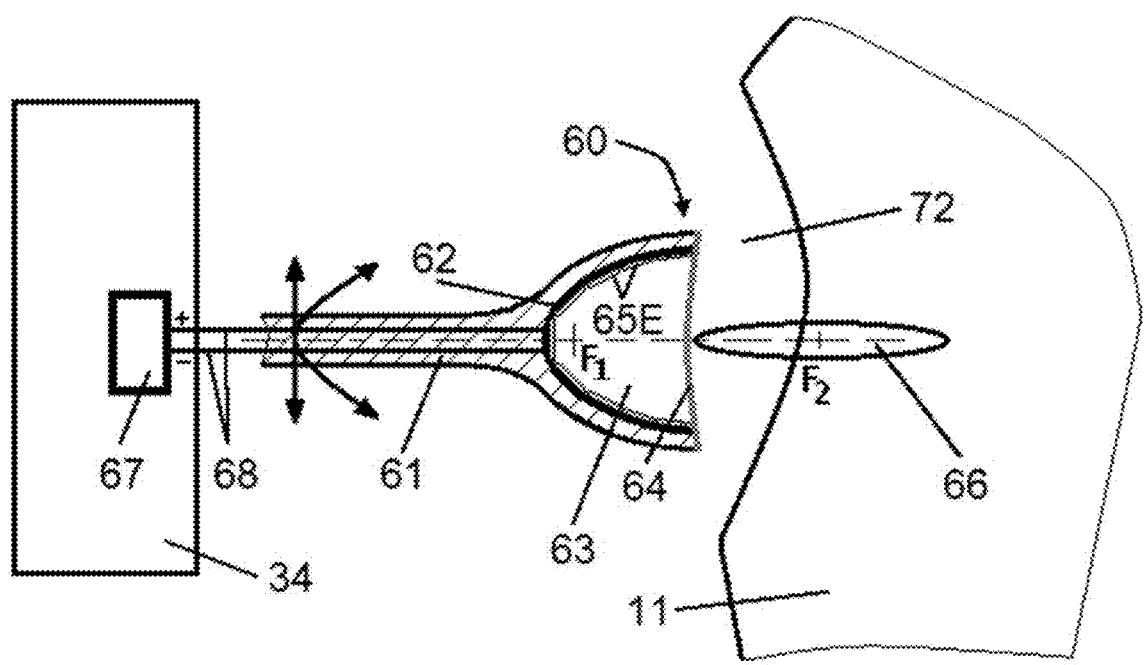
FIG. 6C is a schematic representation of application of acoustic pressure shock waves for the cleaning of animal meat/carcasses via piezoelectric generators using piezo crystals, according to one embodiment of the present invention.

In FIG. 6C the acoustic pressure shock waves 54 (schematically shown in FIG. 5) are generated via piezo crystals/piezo ceramics 65E (piezoelectric principle using piezo crystals or piezo ceramics). In this case a mechanical strain resulting from an applied electrical field to the piezo crystals/piezo ceramics 65E, which are uniformly placed on the ellipsoidal reflector 62, generate in a fluid present inside the reflector cavity 63 the acoustic pressure shock waves 54 (schematically shown in FIG. 5). The electrical field for the piezo crystals/piezo ceramics 65E is provided by the power source 67 via cable 68. The power source 67 is an integral part of the shock wave applicators control station 34. Also, in this case the acoustic pressure shock waves 54 (schematically shown in FIG. 5) are generated inside the acoustic pressure shock wave applicator 60, which has an ellipsoidal reflector 62 that resides inside the applicator body 61. An applicator membrane 64 sits at the aperture/opening of the ellipsoidal reflector 62 and thus creating a reflector cavity 63, which is filled with a liquid. The acoustic pressure shock waves 54 (schematically shown in FIG. 5) produced by the vibration of the piezo crystals/piezo ceramics 65E are focused and transmitted in-between applicator and animal meat/carcass space 72 that must be filled with a liquid too, to avoid unnecessary reflections and loss of energy at the interface of different mediums of dissimilar acoustic properties. The focusing of the acoustic pressure shock waves 54 (schematically shown in FIG. 5) is produced by the ellipsoidal reflector 62 towards the focal volume 66 that must intersect the targeted area, which in this case is the surface of the animal meat/carcasses 11.

Due to the parallelepipedic geometry of the piezo crystals/piezo ceramics 65E, they are not confirming very well to the ellipsoidal reflector 62, which can create problems with focusing of acoustic pressure shock waves 54 (schematically shown in FIG. 5). To overcome this issue piezo fibers can be used as presented in FIG. 6D. The piezo fibers can be integrated in a composite material with their longitudinal axis perpendicular to a solid surface, as the ellipsoidal reflector 62, thus forming a piezo fiber reflector 65F. The acoustic pressure shock waves 54 (schematically shown in FIG. 5) are generated inside the acoustic pressure shock wave applicator 60, which has an ellipsoidal reflector 62 that resides inside the applicator body 61. An applicator membrane 64 sits at the aperture/opening of the ellipsoidal reflector 62 and thus creating a reflector cavity 63, which is filled with a liquid. The electrical field for the piezo fiber reflector 65F is provided by the power source 67 via cable 68. The power source 67 is an integral part of the shock wave applicators control station 34. The advantage of the piezo fibers when compared to the piezo crystals/piezo ceramics 65E is their smaller dimension and cylindrical geometry that allows them to confirm significantly better to the ellipsoidal geometry of the ellipsoidal reflector 62. Furthermore, the contacting of the piezo fibers may be realized by a common electrically conductive layer according to the interconnection requirements. Hence, the complex electrical interconnection of a multitude of piezo crystals/piezo ceramics on the ellipsoidal reflectors 62 (as presented in FIG. 6C) is no longer required. When an electrical field is provided by the power source 67 (included in the shock wave applicators control station 34) via cable 68 to the piezo fiber reflector 65F, the piezo electric fiber will stretch in unison mainly in their lengthwise direction, which will create acoustic pressure shock waves 54 (schematically shown in FIG. 5) that are focused and transmitted in-between applicator and animal meat/carcass space 72, which must be filled with a liquid too, to avoid unnecessary reflections and loss of energy at the interface of different mediums of dissimilar acoustic properties. The focusing of the acoustic pressure shock waves 54 (schematically shown in FIG. 5) is produced by the ellipsoidal reflector 62 towards the focal volume 66 that must intersect the targeted area, which in this case is the surface of the animal meat/carcasses 11. This represents the piezoelectric principle using piezo fibers to produce acoustic pressure shock waves 54 (schematically shown in FIG. 5).

Figure 6D:
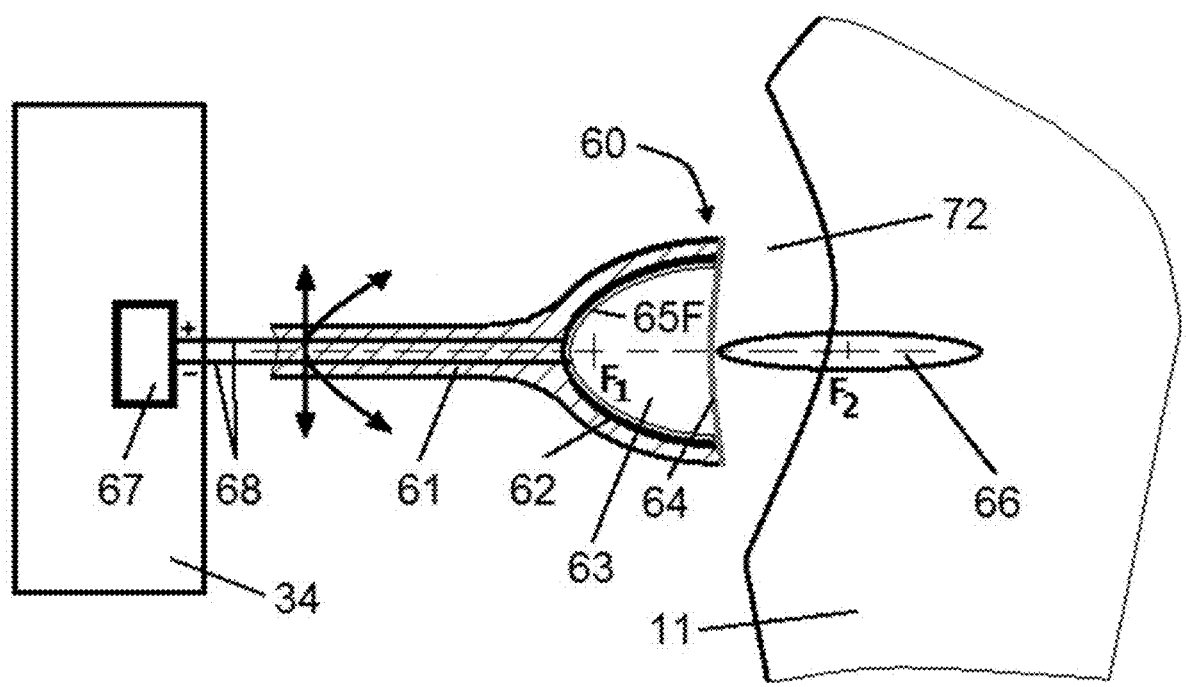
FIG. 6D is a schematic representation of application of acoustic pressure shock waves for the cleaning of animal meat/carcasses via piezoelectric generators using piezo fibers, according to one embodiment of the present invention.
Figure 6E:
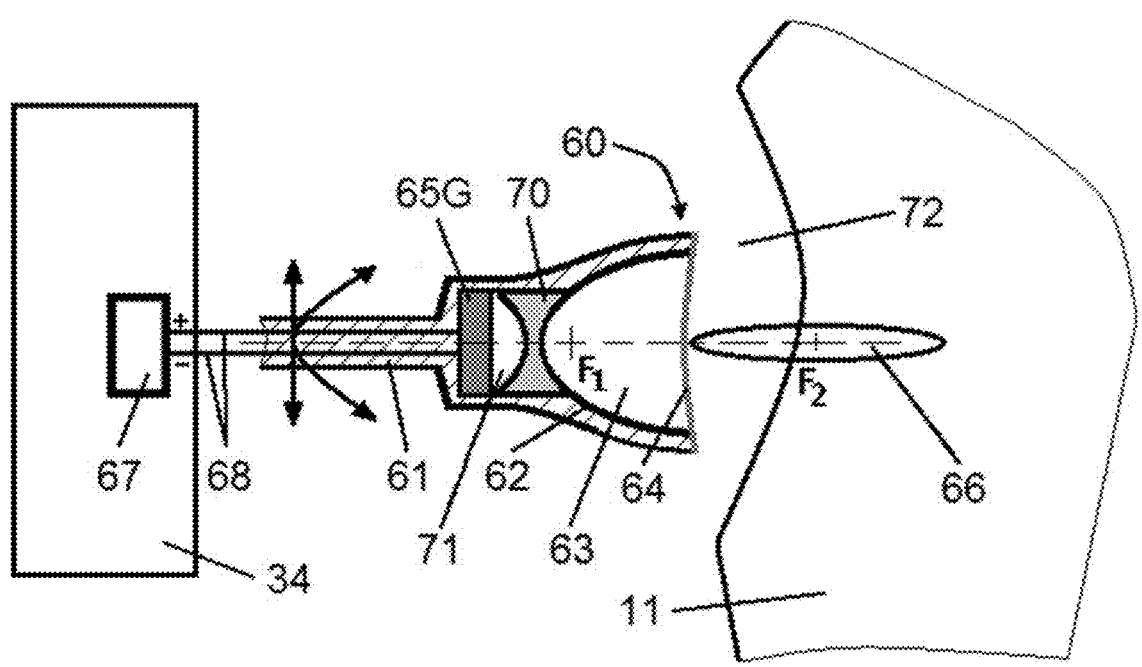
FIG. 6E is a schematic representation of application of acoustic pressure shock waves for the cleaning of animal meat/carcasses via electromagnetic generators using a flat coil and an acoustic lens, according to one embodiment of the present invention.

In FIG. 6E the acoustic pressure shock waves 54 (schematically shown in FIG. 5) are generated via electromagnetic flat coil and plate assembly 65G and an acoustic lens 70 (electromagnetic principle using a flat coil and an acoustic lens). In this case, an electromagnetic flat coil is placed near a metal plate that acts as an acoustic source and thus creating the electromagnetic flat coil and plate assembly 65G presented in FIG. 6E. When the electromagnetic flat coil is excited by a short electrical pulse provided by the power source 67 (included in the shock wave applicators control station 34) via cable 68, the plate experiences a repulsive force, and this is used to generate an acoustic pressure wave. Since the metal plate is flat, the resulting acoustic pressure wave is a planar pressure wave (not shown in FIG. 6E) moving in the liquid-filled cavity 71 towards the acoustic lens 70 that is focusing the planar pressure wave and thus creating acoustic pressure shock waves 54 (schematically shown in FIG. 5) that are sent towards the targeted area via the fluid-filled reflector cavity 63. The focusing effect of the acoustic lens 70 is given by its shape, which is a portion of an ellipsoidal surface, like the ellipsoidal reflector 62 that sits inside the acoustic pressure shock wave applicator 60, besides the acoustic lens 70 and together can contribute to the focusing of the acoustic pressure shock waves 54 (schematically shown in FIG. 5). Both the acoustic lens 70 and the ellipsoidal reflector 62 reside inside the applicator body 61. An applicator membrane 64 sits at the aperture/opening of the ellipsoidal reflector 62 and thus creating a reflector cavity 63, which is filled with a liquid. Alternatively, the acoustic lens 70 can be the only reflective surface and there is no need for the additional ellipsoidal reflector 62 for focusing the acoustic pressure shock waves 54 (schematically shown in FIG. 5) through the in-between applicator and animal meat/carcass space 72 and towards the focal volume 66. For performing the thorough cleaning with acoustic pressure shock waves 54 (schematically shown in FIG. 5), their focal volume 66 must intersect the targeted area, which in this case is the surface of the animal meat/carcasses 11.

Figure 6F:
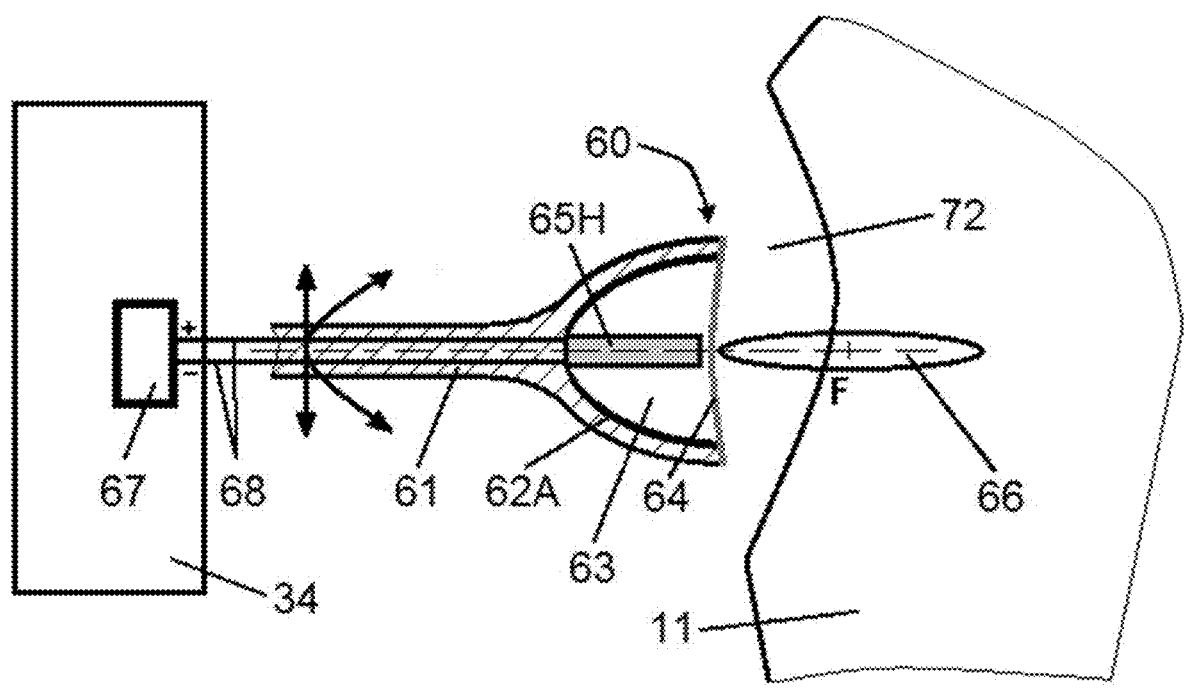
FIG. 6F is a schematic representation of application of acoustic pressure shock waves for the cleaning of animal meat/carcasses via electromagnetic generators using a cylindrical coil, according to one embodiment of the present invention.

In FIG. 6F the acoustic pressure shock waves 54 (schematically shown in FIG. 5) are generated via electromagnetic cylindrical coil and tube plate assembly 65H (electromagnetic principle using a cylindrical coil). In this case, an electromagnetic cylindrical coil is excited by a short electrical pulse provided by the power source 67 (included in the shock wave applicators control station 34) via cable 68, and the plate is in the shape of a tube (thus creating an electromagnetic cylindrical coil and tube plate assembly 65H), which results in a cylindrical wave (not shown in FIG. 6F) that can be focused by a parabolic reflector 62A towards the targeted area via the fluid-filled reflector cavity 63 of the acoustic pressure shock wave applicator 60. Similarly, to what was presented before, the acoustic pressure shock wave applicator 60 has its parabolic reflector 62A residing inside the applicator body 61. An applicator membrane 64 sits at the aperture/opening of the parabolic reflector 62A and thus creating a reflector cavity 63, which is filled with a liquid. The acoustic pressure shock waves 54 (schematically shown in FIG. 5) are focused and transmitted in-between applicator and animal meat/carcass space 72, which must be filled with a liquid too, to avoid unnecessary reflections and loss of energy at the interface of different mediums of dissimilar acoustic properties. In this case, the focusing of the acoustic pressure shock waves 54 (schematically shown in FIG. 5) is produced by the parabolic reflector 62A towards its only focal point F placed inside the focal volume 66 that must intersect the targeted area, which is the surface of the animal meat/carcasses 11.

For FIG. 6A, FIG. 6B, FIG. 6C, and FIG. 6D the acoustic pressure shock waves 54 (schematically shown in FIG. 5) produced inside ellipsoidal reflector 62 are then reflected/focused by the ellipsoidal reflector 62 towards the second focal point $F_2$ of the ellipsoid. In fact, the ellipsoidal reflector 62 in these cases is only a half of an ellipsoid, to allow the transmission of the acoustic pressure shock waves 54 (schematically shown in FIG. 5) towards the animal meat/carcasses 11, where the second focal point $F_2$ should be found. In this way the other half of the ellipsoid is missing to allow the placement of the animal meat/carcasses 11, without any physical interference with the acoustic pressure shock wave applicator 60. For FIG. 6E the acoustic pressure shock waves 54 (schematically shown in FIG. 5) are focused towards the targeted area by the acoustic lens 70 (it has the shape of a portion of an ellipsoidal surface) and for FIG. 6F the focusing is realized by the parabolic reflector 62A. Since different pressures fronts (direct or reflected) reach the second focal point $F_2$ (for ellipsoidal geometries) or focus point F (for parabolic geometries) with certain small-time differences, the acoustic pressure shock waves 54 (schematically shown in FIG. 5) are concentrated or focused on a three-dimensional space around second focal point $F_2$/focus point F, which is called focal volume 68. Inside the focal volume 68 are found the highest-pressure values for each acoustic pressure shock wave 54 (schematically shown in FIG. 5), which means that it is preferable to position the targeted area in such way to intersect the focal volume 68 and if possible centered on the second focal point $F_2$ (for ellipsoidal geometries) or focus point F (for parabolic geometries).

The cleaning effects on the animal meat/carcasses 11 and the geometry of the focal volume 68 are dictated by energy setting for acoustic pressure shock waves 54 (schematically shown in FIG. 5) or input energy, applicator membrane 64 geometry and dimensional characteristics of the ellipsoidal reflector 62 (dictated by the ratio of the large semi-axis and small semi-axis of the ellipsoid, and by its aperture defined as the dimension of the opening of the ellipsoidal reflector 62). Thus, the ellipsoidal reflector 62 needs to be deep enough to allow a deep second focal point $F_2$ (for ellipsoidal geometries) or focus point F (for parabolic geometries) that can be positioned on animal meat/carcasses 11 without any interference in between the acoustic pressure shock wave applicators 60 and the animal meat/carcasses 11. The deep ellipsoidal reflector 62 is also advantageous since the larger the focusing area of the ellipsoidal reflector 62, the larger the focal volume 66 will be and the energy associated with it, which is deposited into the targeted area—in this case the animal meat/carcass 11. In general, to accomplish that, the ratio of the large semi-axis and small semi-axis of the ellipsoid should have values larger than 1.6.

For the parabolic reflector 62A (presented in FIG. 6F) its geometry should be chosen in such way that the focus point of the parabola F should be positioned deep enough to allow its overlap with the animal meat/carcasses 11. That means that the focal length (defined as distance between the bottom of the reflector where the parabola is most sharply curved and the focus point of the parabola F) for the parabolic reflector 62A should be at least 25 cm.

The liquid present inside the reflector cavity 63 in between ellipsoidal reflector 62 and applicator membrane 64 (for embodiments presented in FIG. 6A and FIG. 6B), can be a mixture of water with proprietary substance/particles/catalysts that promote a better discharge and recombination of free radicals back to water form, as presented in U.S. Pat. Nos. 6,080,119 and 9,198,825. The other embodiments presented in FIG. 6C, FIG. 6D, FIG. 6E, and FIG. 6F only a degassed liquid is necessary to be placed in cavity 63 in between ellipsoidal reflector 62 and applicator membrane 64.

The quantity of energy used for the cleaning of the animal meat/carcasses 11 by the acoustic pressure shock waves 54 (schematically shown in FIG. 5) is dependent on the dosage, which includes the following elements:

Input energy delivered by the shock wave applicators control station 3, which is provided by the power source 67 via cable 68 (see FIG. 6A, FIG. 6B, FIG. 6C, FIG. 6D, FIG. 6E, and FIG. 6F);

Output energy at the surface of the animal meat/carcasses 11 for each acoustic pressure shock wave 54 (schematically shown in FIG. 5), known as energy flux density or instantaneous intensity at each point inside the focal volume 66;

Frequency of repetition for acoustic pressure shock waves 54 (schematically shown in FIG. 5), defined as number of acoustic pressure shock waves 54 per each second;

Total amount of pressure shock waves 54 (schematically shown in FIG. 5), delivered in one pass of each animal meat/carcass 11.

The amount of energy deposited at the surface of the animal meat/carcasses 11 needs to be sufficient to allow the disruption of the biofilms and killing of pathogens. For electrohydraulic devices the input energy from power source 67 is the high voltage discharge in between electrodes 65A and 65B for FIG. 6A and high voltage for the encased lasers 65C and 65D for FIG. 6B. For that the voltage provided by the power source 67 via cable 68 should be in the range of 10 to 50 kV based on the reflective surface of the ellipsoidal reflector 62 incorporated into construction of the acoustic pressure shock wave applicator 60. Basically, the smaller the reflective surface of the ellipsoidal reflector 62 (for example acoustic pressure shock wave applicators 60 that have small apertures of 100 to 200 mm for the ellipsoidal reflector 62) the larger the voltage discharge (30 to 50 kV) will be used. For a larger ellipsoidal reflector 62 that is used in acoustic pressure shock wave applicators 60 (for example acoustic pressure shock wave applicators 60 that have apertures larger than 200 mm for the ellipsoidal reflector 62) the voltage in the range of 10 to 30 kV will be used.

For piezoelectric devices the input energy from power source 67 is the high voltage that excite the piezoelectric crystals/elements from FIG. 6C or the piezoelectric fibers from FIG. 6D. For that the voltage provided by the power source 67 via cable 68 should be in the range of 10 to 30 kV.

For electromagnetic devices the input energy from control unit 67 is the current necessary to activate the electromagnetic flat coil from FIG. 6E or cylindrical electromagnetic coils from FIG. 6F. For that, the power provided by the power source 67 via cable 68 should be in the range of 100 to 1500 VA.

In the embodiments from FIG. 6A, FIG. 6B, FIG. 6C, FIG. 6D, FIG. 6E, and FIG. 6F, the acoustic pressure shock waves 54 (schematically shown in FIG. 5), will need to be strong enough to have sufficient energy at the targeted region (output energy) to destroy the biofilm and pathogens. For that the energy flux density of each acoustic pressure shock wave 54 (schematically shown in FIG. 5), around second focal point $F_2$ (FIG. 6A, FIG. 6B, FIG. 6C, FIG. 6D, and FIG. 6E) or focus point F (FIG. 6F) inside the focal volume 68 should be in the range of 0.10 to 3.00 $mJ/mm^2$.

For killing pathogens from an infected area of the surface of the targeted animal meat/carcasses 11, cavitation plays a primary role in destroying the outer membrane of the pathogens. To have maximum potential for the cavitation phase of the acoustic pressure shock waves 54 (schematically shown in FIG. 5), the repetition rate or frequency of acoustic pressure shock waves 54 is recommended to be in the range of 1 to 8 Hz. To not be negatively influenced by the new incoming acoustic pressure shock wave 54, the cavitation bubbles need sufficient time to grow to their maximum dimension and then collapse with high speed jets that have velocities of more than 100 m/s.

Figure 7:
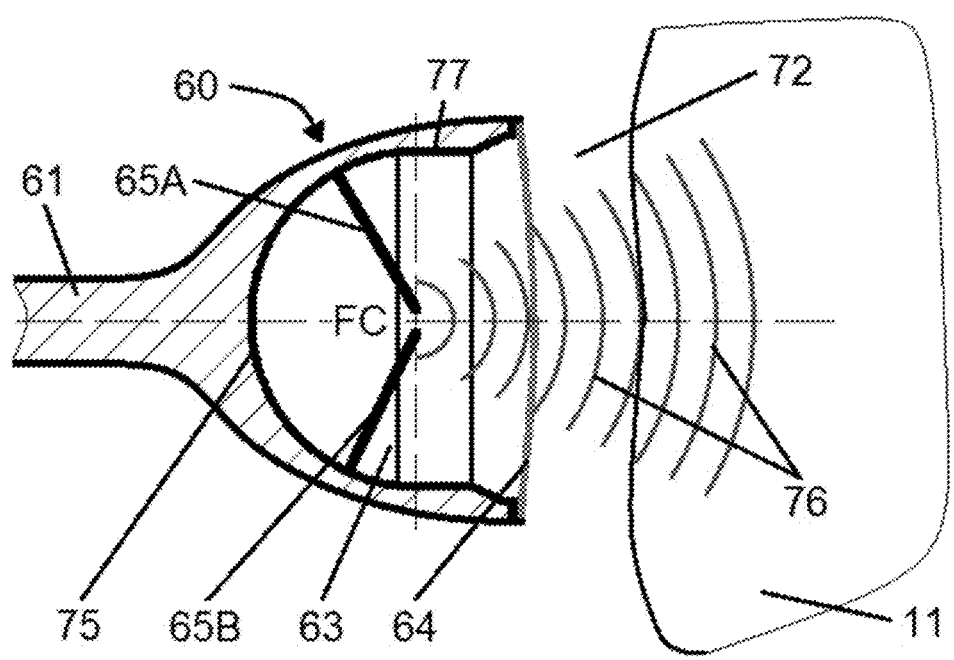
FIG. 7 is a schematic representation of application of acoustic pressure shock waves for the cleaning of animal meat/carcasses via an applicator with a spherical reflector to deliver radial and unfocused acoustic pressure waves to the targeted animal meat/carcasses, according to one embodiment of the present invention.

In the embodiment from FIG. 7 the acoustic pressure wave applicator 60 uses a spherical reflector 75 that sends radial acoustic pressure waves 76 towards the targeted animal meat/carcasses 11. The spherical reflector 75 has only a central point FC (center of the sphere) where the radial acoustic pressure waves 76 are generated (via the high voltage discharge, of the same values as indicated for FIG. 6A, between first electrode 65A and second electrode 65B) and they exit via the aperture of the spherical reflector 75 through the applicator membrane 64. The acoustic pressure shock wave applicator 60 has its spherical reflector 75 residing inside the applicator body 61. An applicator membrane 64 sits at the aperture/opening of the spherical reflector 75 and thus creating a reflector cavity 63, which is filled with a liquid. The radial acoustic pressure waves 76 are transmitted in-between applicator and animal meat/carcass space 72, which must be filled with a liquid too, to avoid unnecessary reflections and loss of energy at the interface of different mediums of dissimilar acoustic properties. For the aperture of the spherical reflector 75 to not interfere with radial acoustic pressure waves 76, the spherical reflector 75 has a cylindrical segment 77 above the plane of the central point FC and slightly tapered at the aperture (reflector's opening). The reflected waves on the bottom surface of the spherical reflector 75 will be sent back towards point FC and not towards the targeted animal meat/carcasses 11. By their nature, the primary radial acoustic pressure waves 76 (exiting through the aperture of the spherical reflector 75) are also unfocused and thus they move inside the targeted animal meat/carcasses 11 away from their point of origin FC without being able to be concentrated in a certain focal region, as seen before for the acoustic pressure shock waves 54 that are focused (schematically shown in FIG. 5). Along their way inside the targeted animal meat/carcasses 11, the radial acoustic pressure waves 76 deposit their energy at the surface of the animal meat/carcasses 11, until all their energy is consumed. In other words, the radial acoustic pressure waves 76 have their maximum energy superficially near the surface of the animal meat/carcasses 11 and become weaker as they travel further inside the animal meat/carcasses 11. Another way to create radial acoustic pressure shock waves 76 is given by ballistic devices that use pneumatics to push at high speeds a small cylindrical piece (bullet) against a plate that vibrates (due to the impact of the bullet) and thus creating/generating radial pressure waves. The ballistic devices were not specifically depicted in any of the figures of this patent, but can be used to generate radial acoustic pressure waves 76.

For the embodiment presented in FIG. 7, the acoustic pressure wave applicators 60 are using radial acoustic pressure waves 76 for the cleaning of animal meat/carcasses 11. For that similar energy flux density outside the applicator membrane 64 for each radial acoustic pressure wave 76 and same frequency range are used, as was presented for embodiments from FIG. 6A, FIG. 6B, FIG. 6C, FIG. 6D, FIG. 6E, and FIG. 6F.

Figure 8:
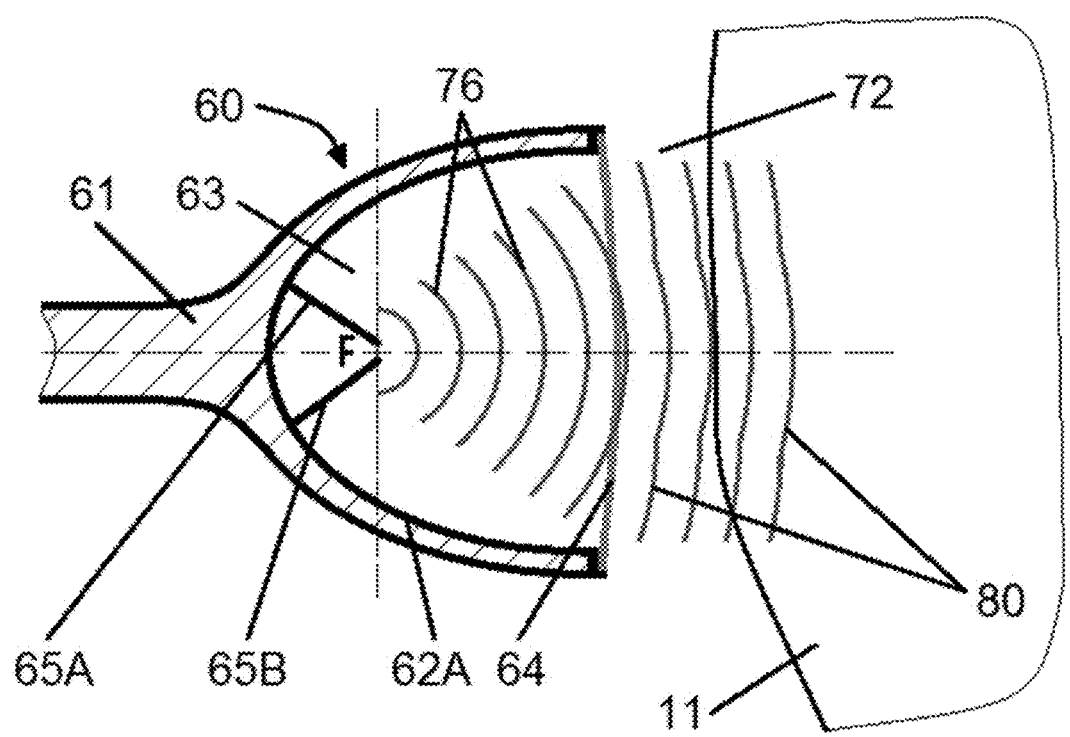
FIG. 8 is a schematic representation of application of acoustic pressure shock waves for the cleaning of animal meat/carcasses via an applicator with a parabolic reflector to deliver pseudo-planar and unfocused acoustic pressure shock waves to targeted animal meat/carcasses, according to one embodiment of the present invention.

In the embodiment from FIG. 8 the acoustic pressure shock wave applicator 60 uses a parabolic reflector 62A that sends pseudo-planar acoustic pressure waves 80 outside the applicator membrane 64 and at the surface of targeted animal meat/carcasses 11. The acoustic pressure shock wave applicator 60 has its parabolic reflector 62A residing inside the applicator body 61. An applicator membrane 64 sits at the aperture/opening of the parabolic reflector 62A and thus creating a reflector cavity 63, which is filled with a liquid. The pseudo-planar acoustic pressure shock waves 80 are transmitted in-between acoustic pressure shock wave applicator and animal meat/carcass space 72, which must be filled with a liquid too, to avoid unnecessary reflections and loss of energy at the interface of different mediums of dissimilar acoustic properties. The parabolic reflector 62A has only a focal point F where radial acoustic pressure waves 76 are generated (via the high voltage discharge between first electrode 65A and second electrode 65B). The radial acoustic pressure waves 76 propagate and reflect on the parabolic reflector 62A at different time points, which creates secondary pressure wave fronts (not shown on FIG. 8 to keep clarity), especially at the edge/aperture of the parabolic reflector 62A. The combination of direct radial acoustic pressure waves 76 with the secondary pressure wave fronts creates pseudo-planar acoustic pressure waves 80 outside the applicator membrane 64. By their nature, the pseudo-planar acoustic pressure waves 80 (exiting through the aperture of the parabolic reflector 62A) are also unfocused and thus they move towards the targeted animal meat/carcasses 11 away from their point of origin F without being able to be concentrated in a certain focal region, as seen before for the acoustic pressure shock waves 54 that are focused (schematically shown in FIG. 5). Along their way towards the targeted animal meat/carcasses 11, the pseudo-planar acoustic pressure waves 80 deposit their energy onto the surface of the targeted animal meat/carcasses 11, until all their energy is consumed. In other words, the pseudo-planar acoustic pressure waves 80 have their maximum energy at the surface of the targeted animal meat/carcasses 11 and become weaker as they travel further inside the targeted animal meat/carcasses 11. The pseudo-planar acoustic pressure waves 80 energy is controlled by the input energy delivered by the power source 67 (see FIG. 6A, FIG. 6B, FIG. 6C, FIG. 6D, FIG. 6E, and FIG. 6F), in the form of high voltage setting for electrohydraulic and piezoelectric devices and current setting for electromagnetic devices.

For the embodiment presented in FIG. 8, the acoustic pressure wave applicators 60 are used for cleaning with pseudo-planar acoustic pressure waves 80 of animal meat/carcasses 11. For that similar energy flux density outside the applicator membrane 64 for each pseudo-planar acoustic pressure waves 80 and same frequency range are used, as was presented for embodiments from FIG. 6A, FIG. 6B, FIG. 6C, FIG. 6D, FIG. 6E, and FIG. 6F.

Planar acoustic pressure waves can be easily generated by relatively flat piezoelectric crystals. This kind of devices were not specifically depicted in any of the figures of this patent, but can be used to generate planar acoustic pressure waves, and direct them towards the targeted animal meat/carcasses 11 for cleaning that does not require the acoustic pressure shock waves 54 that are focused (schematically shown in FIG. 5).

For the embodiment presented in FIG. 8, the acoustic pressure wave applicators 60 are using pseudo-planar acoustic pressure shock waves 80 for the cleaning of animal meat/carcasses 11. For that similar energy flux density outside the applicator membrane 64 for each pseudo-planar acoustic pressure shock waves 80 and same frequency range are used, as was presented for embodiments from FIG. 6A, FIG. 6B, FIG. 6C, FIG. 6D, FIG. 6E, and FIG. 6F.

All the acoustic shock wave applicators 60 presented in FIG. 6A, FIG. 6B, FIG. 6C, FIG. 6D, FIG. 6E, FIG. 6F, FIG. 7, and FIG. 8 have the capability to have swiveling motion S and/or translation motion T, based on the specific need during the cleaning of the animal meat/carcasses 11. The swiveling motion S also allows the sending of acoustic pressure shock waves 54 (schematically shown in FIG. 5), radial acoustic pressure waves 76, or pseudo-planar acoustic pressure shock waves 80 on an angle as explained in FIG. 2.

Figure 9:
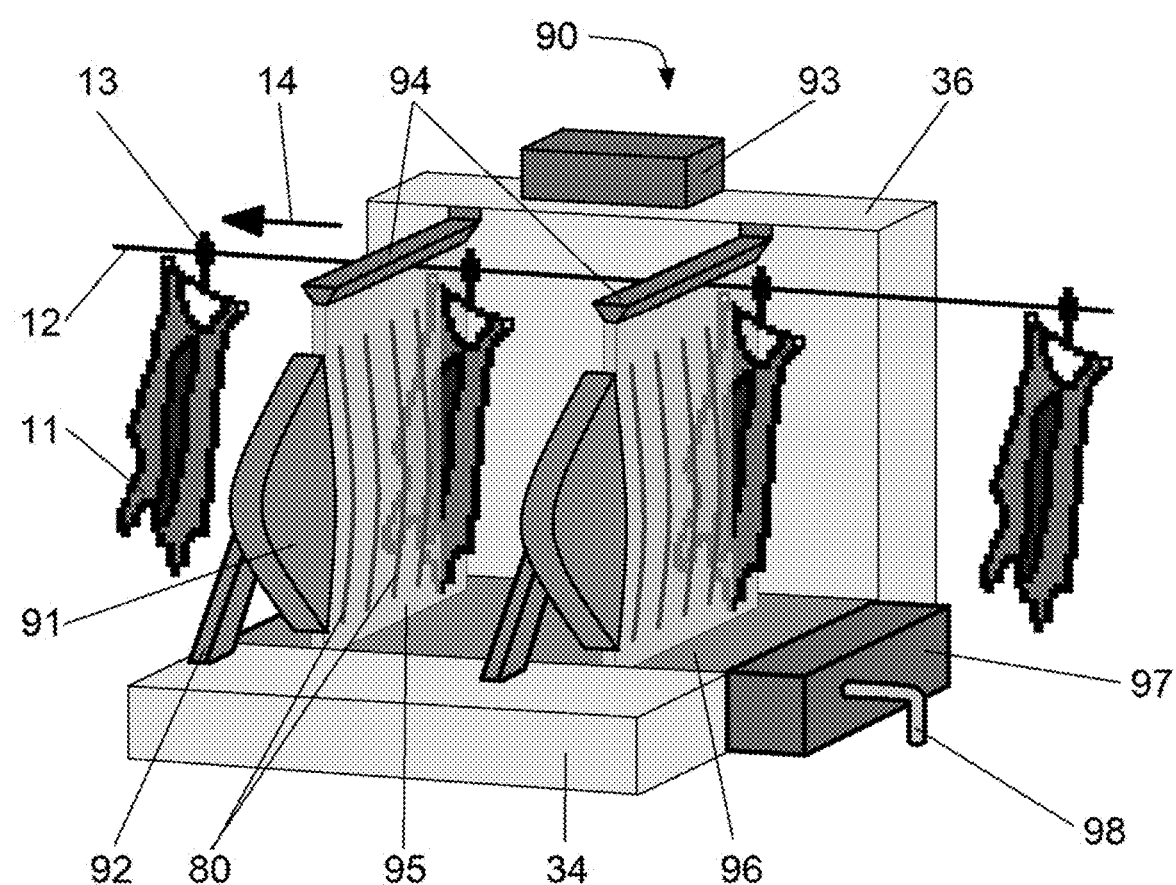
FIG. 9 is a schematic representation of application of acoustic pressure shock waves for the cleaning of animal meat/carcasses using segment shock wave applicator equipped with a segment parabolic reflector to deliver pseudo-planar and unfocused acoustic pressure shock waves through a clean liquid drape to targeted animal meat/carcasses, according to one embodiment of the present invention.

FIG. 9 is presents an embodiment of the animal meat/carcass cleaning process using segment shock wave applicators 90. This embodiment was developed in such way to avoid the completely sinking of the animal meat/carcasses 11 into a tank filled with liquid, to apply pseudo-planar acoustic pressure shock waves 80 for cleaning. The segment shock wave applicator 91 is using a longitudinal slice through a normal/full parabolic reflector 62A, as the ones presented in FIG. 6F and FIG. 8. For the segment shock wave applicator 91 the longitudinal slice is a slice along the longitudinal axis of a paraboloid that also contains the focal point F of the paraboloid. Although only a slice/portion through a paraboloid is used, the segment shock wave applicator 91 is still capable of creating pseudo-planar acoustic pressure shock waves 80 for cleaning of the animal meat/carcasses 11. The advantage of using such segment shock wave applicator 91 is the need of only a clean liquid drape 95 to transmit pseudo-planar acoustic pressure shock waves 80 created by the segment shock wave applicator 91 towards the animal meat/carcasses 11. The use of clean liquid drapes 95 instead of full large tanks filled with liquids will result in significant savings from a liquid consumption point of view and consequently liquid filtration/cleaning, which finally have a significantly environment positive impact.

The segment shock wave applicators 91 are supported and have their electrical connection 99 to the shock wave applicators control station 34 via segment shock wave applicator leg 92 (see FIG. 11A, FIG. 11B, FIG. 11C, FIG. 11D, and FIG. 11E). The segment shock wave applicators 91 are controlled by the shock wave applicators control station 34 for their concomitantly or subsequently activation, for their functioning parameter adjustment based on the specific cleaning needs, etc. Even more the shock wave applicators control station 34 can sense the status of the applicators functioning (optimum or not and warns the user), can stop the applicators when no animal meat/carcasses 11 are detected inside the station, match the applicators' firing based on the speed in the travel direction 14 of the moving chain 12 on which the animal meat/carcasses 11 are hanged via pulley/hook 13, communicate with other stations as the liquid pumping station 36 or the clean liquid drape control station 93, for their optimal functioning as a complete system, etc.

To transmit pseudo-planar acoustic pressure shock waves 80 created by the segment shock wave applicator 91 towards the animal meat/carcasses 11, a clean liquid drape 95 is used that is controlled by the clean liquid drape control station 93. The clean liquid drape 95 is produced using a slotted pipe 94. The control of the fresh liquid is done via the clean liquid drape control station 93, which has an electronic controller that has similar basic function and structure as the one described for the shock wave applicators control station 34 from FIG. 3. The clean liquid drape control station 93 is used to monitor functionality of the liquid pumping station 36, controls the liquid quantity and quality (freshness and cleanness), flow through the slotted pipe 94 to have a continuous and fully functional clean liquid drape 95, and houses an electronic controller, which has similar basic function and structure, as the one described for the shock wave applicators control station 34 from FIG. 3.

The liquid pumping station 36 assures the continuous flow and transfer of clean and fresh liquid towards the clean liquid drape control station 93. The liquid pumping station 36 should have a controller that is used to input parameters, monitor its functionality, controls the liquid quantity and quality (freshness and cleanness), its filtration, etc. The electronic controller of the liquid pumping station 36 has similar basic function and structure, as the one described for the shock wave applicators control station 34 from FIG. 3.

The dirty and contaminated liquid resulted from the cleaning of the animal meat/carcass 11 using the segment shock wave applicator 91 drips gravitationally into the contaminated liquid bath 96 at the bottom of the animal meat/carcass cleaning process using segment shock wave applicators 90. The contaminated liquid pumping station 97 pumps the contaminated liquid via contaminated liquid evacuation pipe 98 towards special designed tanks (not specifically shown in FIG. 9) where will be filtrated or refreshed for a subsequent cleaning cycle of the animal meat/carcass 11. The functioning and basic structure is like the liquid pumping station 36 with specific adaptations necessary for a contaminated liquid (filtration, decontamination, etc.). The electronic controller of the contaminated liquid pumping station 97 has similar basic function and structure, as the one described for the shock wave applicators control station 34 from FIG. 3.

For the animal meat/carcass cleaning process using segment shock wave applicators 90 presented in FIG. 9, the animal meat/carcasses 11 anchored via pulley/hook 13 on the moving chain 12 are moved in travel direction 14 in such way that the animal meat/carcasses 11 after their deskinning (not shown) go through multiple water wash stations 15 (not shown in FIG. 9) to clean any gross contaminates as hair, dirt, etc., from the surface of the animal meat/carcasses 11. Then the animal meat/carcasses 11 enter the animal meat/carcass cleaning process using segment shock wave applicators 90. The animal meat/carcasses 11 are passing at the speed of the meat processing line through the multiple clean liquid drapes 95 where the surface of the animal meat/carcasses 11 is subjected to the pseudo-planar acoustic pressure shock waves 80. Under the action of the pseudo-planar acoustic pressure shock waves 80 different contaminants, bacteria, fungus, biofilms, and harmful microorganisms (that can produce spoilage of the meat) are dislodged or destroyed. The clean liquid of the clean liquid drapes 95 will carry gravitationally these dislodged contaminants, bacteria, funguses, biofilms, and harmful microorganisms towards the contaminated liquid bath 96. Since the action of the pseudo-planar acoustic pressure shock waves 80 is produced on the entire height of the animal meat/carcasses 11 that prevents any reattachment of any contaminants on any other region of the animal meat/carcasses 11. The presence of multiple clean liquid drapes 95 assures a thorough cleaning of the animal meat/carcasses 11. The number of clean liquid drapes 95 should be at least three and can be increased based on the needs of the animal meat/carcasses 11 cleaning process. Furthermore, the animal meat/carcass cleaning process using segment shock wave applicators 90 presented in FIG. 9 is cleaning the animal meat/carcasses 11 only on one side that is exposed to the pseudo-planar acoustic pressure shock waves 80. Therefore, there should be a second mirror-station for animal meat/carcass cleaning process using segment shock wave applicators 90 (subsequent station) that will be able to treat the other side of the animal meat/carcass 11.

The cleaning action of the pseudo-planar acoustic pressure shock waves 80 is produced by the high compressive forces generated in the compressive phase of the shock waves and by the micro jets produced during collapse of the cavitation bubbles created during the tensile phase of the shock waves in the multiple clean liquid drapes 95. Once the animal meat/carcass 11 are passing through the animal meat/carcass cleaning process using segment shock wave applicators 90, the cleanliness of the animal meat/carcasses 11 is assessed by the inspection module 38 (not specifically shown in FIG. 9) via optical/imaging methods or any other methods that can be employed to assess the germ-free and cleanliness of the animal meat/carcasses 11.

Figure 10:
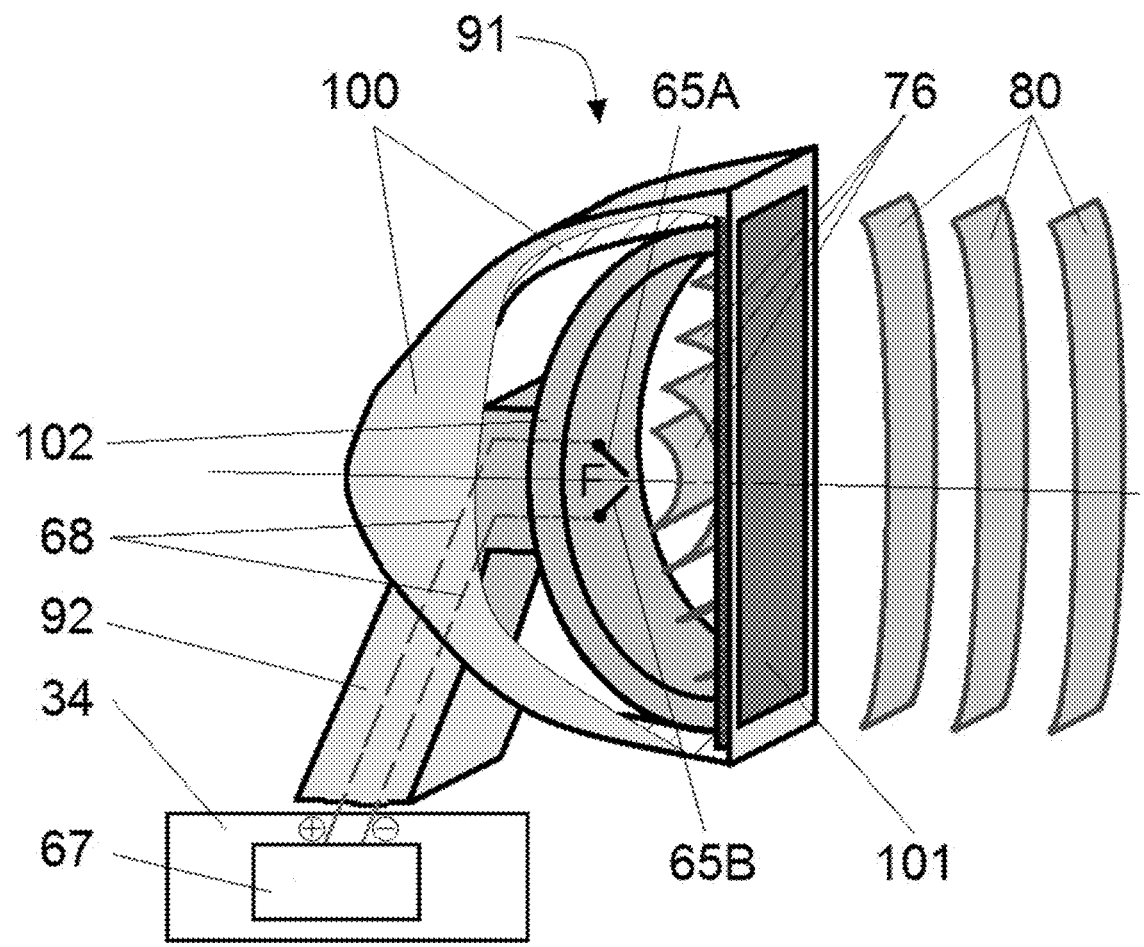
FIG. 10 is a three-dimensional schematic representation of a segment shock wave applicator equipped with a segment parabolic reflector, as seen in FIG. 9, which employs electrohydraulic generators using spark gap high voltage discharges to produce pseudo-planar and unfocused acoustic pressure shock waves to clean animal meat/carcasses, according to one embodiment of the present invention.

A detailed three-dimensional representation of the segment shock wave applicator 91 is presented in FIG. 10. Thus, the segment parabolic reflector 102 sits inside the segment shock wave applicator body 100. A high voltage discharge produced in between first electrode 65A and the second electrode 65B (electrohydraulic principle using spark gap high voltage discharges) in the focal point F of the segment parabolic reflector 102 and in a liquid present inside the segment reflector cavity 110 (see FIG. 11A) generates radial acoustic pressure shock waves 76. The radial acoustic pressure shock waves 76 propagate towards the reflector's surface or outside the segment shock wave applicator body 100. The segment shock wave applicator body 100 has its segment parabolic reflector 102 residing inside the applicator body 61. A segment shock wave applicator membrane 101 that has a rectangular shape sits at the aperture/opening of the segment parabolic reflector 102 and thus creating a segment reflector cavity 110 (see FIG. 10A), which is filled with a liquid. The pseudo-planar acoustic pressure shock waves 80 are transmitted in-between segment shock wave applicator 91 and animal meat/carcass space 72, which must be filled with a liquid too, to avoid unnecessary reflections and loss of energy at the interface of different mediums of dissimilar acoustic properties. The segment parabolic reflector 102 has only a focal point F where radial acoustic pressure waves 76 are generated (via the high voltage discharge between first electrode 65A and second electrode 65B). The radial acoustic pressure waves 76 propagate and reflect on the segment parabolic reflector 102 at different time points, which creates secondary pressure wave fronts (not shown on FIG. 10 to keep clarity), especially at the edge/aperture of the segment parabolic reflector 102. The combination of direct radial acoustic pressure waves 76 with the secondary pressure wave fronts creates pseudo-planar acoustic pressure waves 80 outside the segment shock wave applicator membrane 101. By their nature, the pseudo-planar acoustic pressure waves 80 (exiting through the aperture of the segment parabolic reflector 102) are also unfocused and thus they move towards the targeted animal meat/carcasses 11 away from their point of origin F without being able to be concentrated in a certain focal region, as seen before for the acoustic pressure shock waves 54 that are focused (schematically shown in FIG. 5). Along their way towards the targeted animal meat/carcasses 11, the pseudo-planar acoustic pressure waves 80 deposit their energy onto the surface of the targeted animal meat/carcasses 11, until all their energy is consumed. In other words, the pseudo-planar acoustic pressure waves 80 have their maximum energy at the surface of the targeted animal meat/carcasses 11 and become weaker as they travel further inside the targeted animal meat/carcasses 11. The pseudo-planar acoustic pressure waves 80 energy is controlled by the input energy delivered by the power source 67, in the form of high voltage setting for electrohydraulic devices. The power source 67 is an integral part of the shock wave applicators control station 34, which has similar functionality and components as the one presented in FIG. 3.

As mentioned before, the segment shock wave applicators 91 are supported and have their electrical connection 99 (see FIG. 11A, FIG. 11B, FIG. 11C, and FIG. 11D) to the shock wave applicators control station 34 via segment shock wave applicator leg 92. The electrical connection 99 can be in the form of cable 68, as presented in FIGS. 6A-6F.

Cross-sectional views of the segment shock wave applicators 91 are presented in FIG. 11A, FIG. 11B, FIG. 11C, and FIG. 11D, for different principles of producing the pseudo-planar acoustic pressure waves 80.

Figure 11A:
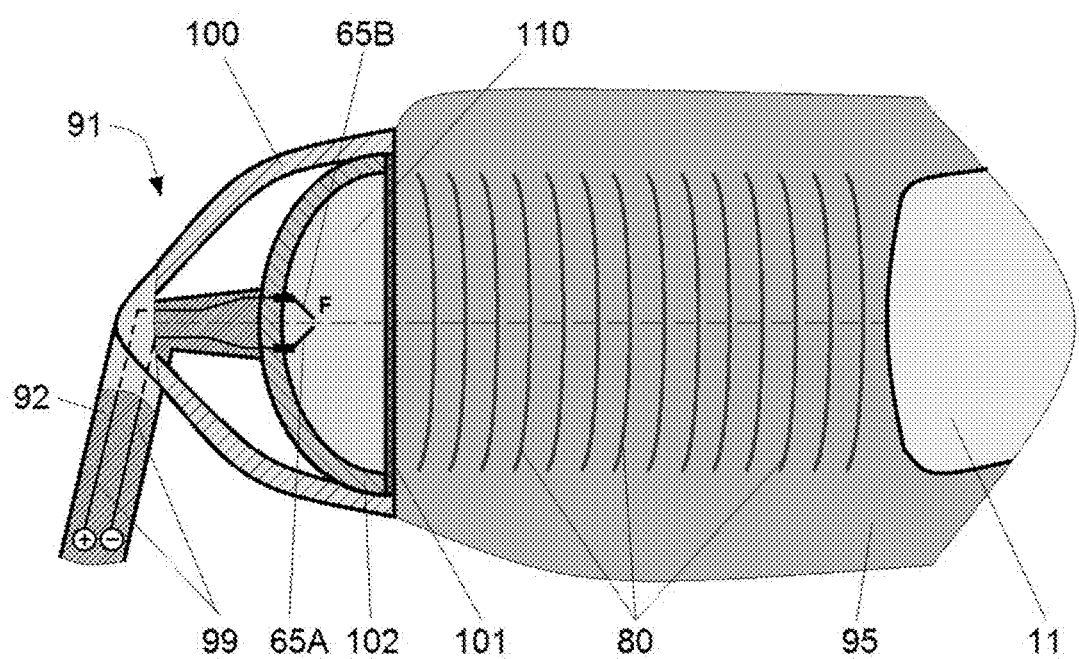
FIG. 11A is a planar schematic representation of a segment shock wave applicator equipped with a segment parabolic reflector, which employs electrohydraulic generators using spark gap high voltage discharges to produce pseudo-planar and unfocused acoustic pressure shock waves to clean animal meat/carcasses, according to one embodiment of the present invention.

In FIG. 11A the pseudo-planar acoustic pressure waves 80 are generated inside the segment shock wave applicator 91, which has a segment parabolic reflector 102 that resides inside the segment shock wave applicator body 100. A segment shock wave applicator membrane 101 sits at the aperture/opening of the segment parabolic reflector 102 and thus creating a segment reflector cavity 110, which is filled with a liquid. The pseudo-planar acoustic pressure waves 80 are produced via high voltage discharge produced in between first electrode 65A and the second electrode 65B at the paraboloidal focal point F (electrohydraulic principle using spark gap high voltage discharges) in a liquid present inside the segment reflector cavity 110. The high voltage for the first electrode 65A and the second electrode 65B is provided by the power source 67 (not shown in FIG. 11A) via electrical connection 99. The segment shock wave applicators 91 are supported and have their electrical connection 99 to the shock wave applicators control station 34 (not shown in FIG. 11A) via segment shock wave applicator leg 92. The two electrodes 65A and 65B are positioned in the paraboloidal focal point F of the segment parabolic reflector 102 and during their discharge they produce a plasma bubble in the liquid from segment reflector cavity 110 that expands and collapse transforming the heat into kinetic energy first in the form of radial acoustic pressure shock waves 76 (shown in FIG. 10) and outside the segment parabolic reflector 102 in the form of pseudo-planar acoustic pressure waves 80. This represents the electrohydraulic principle to produce pseudo-planar acoustic pressure waves 80, which are transmitted in-between segment shock wave applicators 91 and animal meat/carcass 11 via the clean liquid drape 95.

Figure 11B:
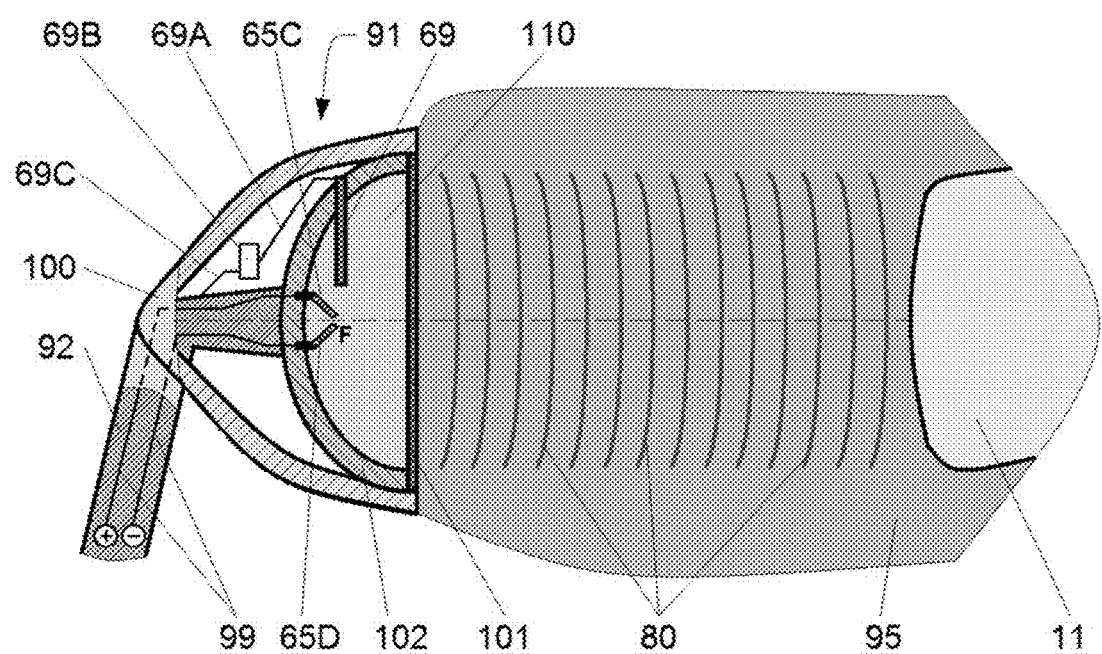
FIG. 11B is a planar schematic representation of a segment shock wave applicator equipped with a segment parabolic reflector, which employs electrohydraulic generators using one or multiple laser sources to produce pseudo-planar and unfocused acoustic pressure shock waves to clean animal meat/carcasses, according to one embodiment of the present invention.

In FIG. 11B the pseudo-planar acoustic pressure waves 80 are generated via one or multiple laser sources (electrohydraulic principle using one or multiple lasers sources). The pseudo-planar acoustic pressure waves 80 are generated inside the segment shock wave applicator 91, which has a segment parabolic reflector 102 that resides inside the segment shock wave applicator body 100. A segment shock wave applicator membrane 101 sits at the aperture/opening of the segment parabolic reflector 102 and thus creating a segment reflector cavity 110, which is filled with a liquid. The laser beams produced by first incased laser 65C and the second incased laser 65D are positioned in such way to intersect their beams in the focal point F of the segment parabolic reflector 102 to produce a plasma bubble in the liquid from segment reflector cavity 110 that expands and collapse transforming the heat into kinetic energy in the form of radial acoustic pressure shock waves 76 (shown in FIG. 10) and outside the segment parabolic reflector 102 in the form of pseudo-planar acoustic pressure waves 80. The high voltage for the first incased laser 65C and the second incased laser 65D is provided by the power source 67 (not shown in FIG. 11B) via electrical connection 99. The two laser sources from FIG. 6B include means of monitoring the system performance by measuring the reaction temperature of the plasma bubble collapse using a method of optical fiber thermometry. An optical fiber tube assembly 69 extends into the F region of the segment parabolic reflector 102. The optical fiber tube assembly 69 transmits (via optical fiber 69A) specific spectral frequencies created from the sonoluminescence of the plasma reaction in the liquid present inside the segment reflector cavity 110 to the spectral analyzer 69B. The loop is closed via feedback cable 69C that connects the spectral analyzer 69B with the power source 67 (not shown in FIG. 11B) through the segment shock wave applicator leg 92. Basically, the spectral analysis provided by the spectral analyzer 69B is used to adjust accordingly the power generated by the power source 67 (not shown in FIG. 11B), to ensure a proper laser discharge for the incased lasers 65C and 65D. As presented for FIG. 11A, also in this case the pseudo-planar acoustic pressure waves 80 are transmitted in-between segment shock wave applicators 91 and animal meat/carcass 11 via the clean liquid drape 95.

Figure 11C:
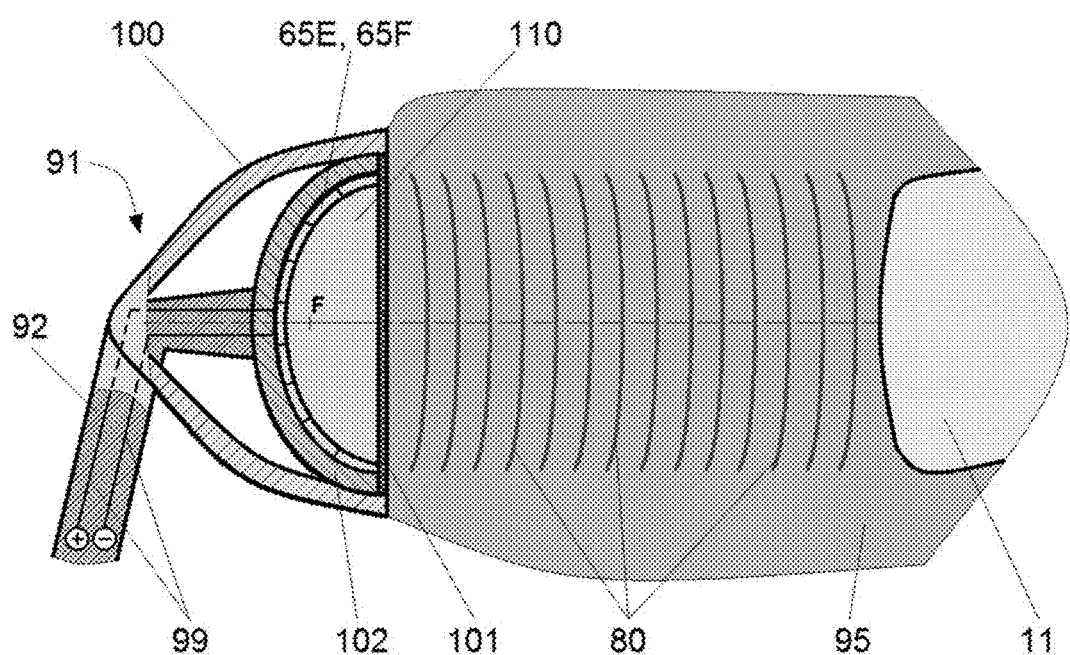
FIG. 11C is a planar schematic representation of a segment shock wave applicator equipped with a segment parabolic reflector, which employs piezoelectric generators using piezo crystals or piezo fibers to produce pseudo-planar and unfocused acoustic pressure shock waves to clean animal meat/carcasses, according to one embodiment of the present invention.

In FIG. 11C the pseudo-planar acoustic pressure waves 80 are generated via piezo crystals/piezo ceramics 65E or piezo fibers 65F (piezoelectric principle using piezo crystals/piezo ceramics or piezo fibers). In this case a mechanical strain resulting from an applied electrical field to the piezo crystals/piezo ceramics 65E or piezo fibers 65F, which are uniformly placed on the segment parabolic reflector 102, generate in a fluid present inside the segment reflector cavity 110 the pseudo-planar acoustic pressure waves 80. The electrical field for the piezo crystals/piezo ceramics 65E or piezo fibers 65F is provided by the power source 67 (not shown in FIG. 11C) via electrical connection 99. The segment shock wave applicators 91 are supported and have their electrical connection 99 to the shock wave applicators control station 34 (not shown in FIG. 11C) via segment shock wave applicator leg 92. The segment shock wave applicator 91 has a segment parabolic reflector 102 that resides inside the segment shock wave applicator body 100. A segment shock wave applicator membrane 101 sits at the aperture/opening of the segment parabolic reflector 102 and thus creating a segment reflector cavity 110, which is filled with a liquid. The pseudo-planar acoustic pressure waves 80 produced by the vibration of the piezo crystals/piezo ceramics 65E or piezo fibers 65F are transmitted in-between segment shock wave applicators 91 and animal meat/carcass 11 via the clean liquid drape 95.

Figure 11D:
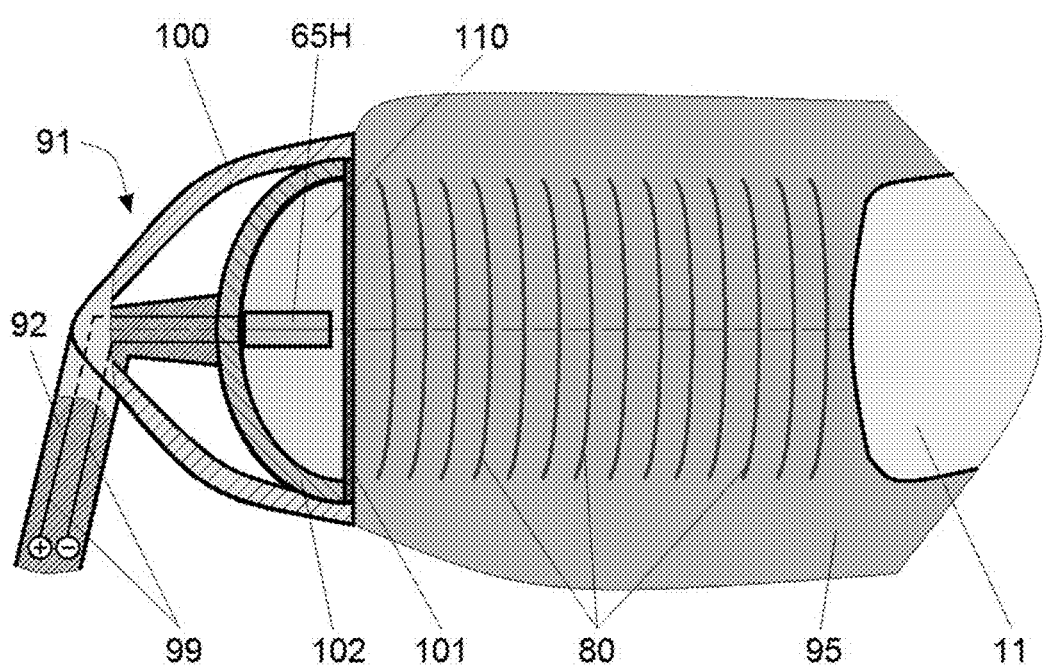
FIG. 11D is a planar schematic representation of a segment shock wave applicator equipped with a segment parabolic reflector, which employs electromagnetic generators using a cylindrical coil to produce pseudo-planar and unfocused acoustic pressure shock waves to clean animal meat/carcasses, according to one embodiment of the present invention.

In FIG. 11D the pseudo-planar acoustic pressure waves 80 are generated via electromagnetic cylindrical coil and tube plate assembly 65H (electromagnetic principle using a cylindrical coil). In this case, an electromagnetic cylindrical coil is excited by a short electrical pulse provided by the power source 67 (not shown in FIG. 11D) via electrical connection 99, and the plate is in the shape of a tube (thus creating an electromagnetic cylindrical coil and tube plate assembly 65H), which results in a cylindrical wave (not shown in FIG. 11D) that can be focused by a segment parabolic reflector 102 towards the targeted area via the fluid-filled segment reflector cavity 110 of the segment shock wave applicators 91. The segment shock wave applicators 91 are supported and have their electrical connection 99 to the shock wave applicators control station 34 (not shown in FIG. 11A) via segment shock wave applicator leg 92. Similarly, to what was presented before, the segment shock wave applicators 91 has its segment parabolic reflector 102 residing inside the segment shock wave applicator body 100. A segment shock wave applicator membrane 101 sits at the aperture/opening of the segment parabolic reflector 102 and thus creating a segment reflector cavity 110, which is filled with a liquid.

The pseudo-planar acoustic pressure waves 80 produced by the vibration of the electromagnetic cylindrical coil and tube plate assembly 65H are transmitted in-between segment shock wave applicators 91 and animal meat/carcass 11 via the clean liquid drape 95.

FIG. 12 is presents a small animal carcasses/meat cleaning process using shock waves 120. The small animal carcass/meat 121 are hanging on a moving chain 12 via pulley/hooks 13 and they are moving in the travel direction 14. A small animal carcasses/meat processing shock wave tank 123 sitting on foundation 122 using tank legs 128. The small animal carcasses/meat processing shock wave tank 123 is used to submerge the small animal carcass/meat 121 into shock wave propagating liquid 42 to be subjected to acoustic pressure shock waves 54. To produce a thorough cleaning from all possible contaminants and pathogens, acoustic pressure shock waves 54 need to be directed all around the liquid submerged small animal carcass/meat 121A. Therefore, the small animal carcasses/meat processing shock wave tank 123 is equipped with bottom shock waves applicators 45 and lateral shock waves applicators 33. These applicators have either ellipsoidal reflectors 62 or parabolic reflector 62A or spherical reflector 75 for producing focused acoustic pressure shock waves 54, pseudo-planar acoustic pressure shock waves 80, or radial acoustic pressure shock waves 76, respectively. The bottom shock waves applicators 45 and lateral shock waves applicators 33 have their electrical connection 99 with the power source 67 that provides the energy to the applicators 33 and 45. The total number of acoustic pressure shock wave applicators 33 and 45 should be well tailored for the small animal carcasses/meat processing shock wave tank 123 capacity and the speed in the travel direction 14 for the small animal carcass/meat 121. To completely clean the small animal carcass/meat 121, there should be a very good coordination in between shock wave applicators control station 34, liquid pumping station 36, and chain moving station 126.

The lateral shock waves applicators 33 and bottom shock waves applicators 45 can be controlled by a shock wave applicators control station 34—such as for their concomitant or subsequent activation, for their functioning parameter adjustment based on the specific cleaning needs, for their independently-controlled possible swiveling S and translational T movements, etc. Even more, the shock wave applicators control station 34 can sense the status of the applicators functioning (optimum or not and warns the user), can stop the applicators when no animal meat/carcasses 11 are detected inside the station, can match the applicators' firing based on the speed of the moving chain 12, can communicate with other stations as the liquid pumping station 36 or chain moving station 126 for optimal functioning, etc.

To control the proper functionality of both lateral shock waves applicators 33 and bottom shock waves applicators 45, a shock wave applicators control console 46 is used, which is an integral part of the shock wave applicators control station 34. The controller associated with shock wave applicators control console 46 has similar basic function and structure as the one described for the shock wave applicators control station 34 from FIG. 3. The shock wave applicators control console 46 is transmitting commands, electrical signals, and power towards the acoustic pressure shock waves applicators 33 and 45. Furthermore, the shock wave applicators control console 46 is controlling the lateral acoustic pressure shock wave applicators 33 and bottom acoustic pressure shock wave applicators 45 for their concomitantly or subsequently activation, their functioning parameter adjusted based on the specific cleaning needs, and for their independently-controlled swiveling S and translational T movements (see FIG. 6A, FIG. 6B, FIG. 6C, FIG. 6D, FIG. 6E, FIG. 6F, FIG. 7, and FIG. 8), etc. Even more the shock wave applicators control console 46 can sense the status of the applicators functioning (optimum or not and warns the user), can stop the applicators when no liquid submerged small animal carcass/meat 121A are detected inside the small animal carcasses/meat processing shock wave tank 123, match the applicators' firing based on the speed of the moving chain 12, communicate with other stations as the liquid pumping station 36 or chain moving station 126 for optimal functioning for optimal functioning, etc.

The cleanliness for shock wave propagating liquid 42 and the optimum liquid level 48 from the small animal carcasses/meat processing shock wave tank 123 are maintained and controlled by the liquid pumping station 36. The fresh liquid pipe for liquid pumping station 124 and liquid draining pipe for liquid pumping station 125 assures the transfer of liquid in between the small animal carcasses/meat processing shock wave tank 123 and liquid pumping station 36. The liquid from the small animal carcasses/meat processing shock wave tank 123 needs to be cleaned and filtrated periodically to avoid cross contamination. The best solution is a continuous flow of fresh liquid to avoid cross contamination of the surface of the liquid submerged small animal carcass/meat 121A. The liquid pumping station control console 47 is used to input parameters, monitor functionality of the liquid pumping station 36, controls the liquid quantity and quality (freshness and cleanness), its filtration, discards soiled liquid in special designed tanks, and houses an electronic controller, which has similar basic function and structure, as the one described for the shock wave applicators control station 34 from FIG. 3.

The chain moving station 126 and its chain moving station control console 127 are controlling the speed and synchronicity of the moving chain 12 with the firing of the lateral acoustic pressure shock wave applicators 33 and bottom acoustic pressure shock wave applicators 45. The chain moving station control console 127 has an electronic controller, which has similar basic function and structure, as the one described for the shock wave applicators control station 34 from FIG. 3.

Acoustic pressure shock waves 54 (schematically shown in FIG. 5) that are focused can be also used to disinfect the processed animal meat towards the end of the meat processing where different cuts or ground meat is packaged in bags. The U.S. Pat. No. 9,095,632 patent describes the use of acoustic pressure shock waves 54 that are focused for meat packaged in bags. For the ground meat, usually after grinding the meat is pushed through pipes that are encompassed by other large pipes that circulate hot water, to prevent the sticking of the ground meat on the pipe. This offers an opportunity to clean ground meat with acoustic pressure shock waves 54, or pseudo-planar acoustic pressure shock waves 80, or radial acoustic pressure shock waves 76 before being packaged in plastic pouches.

Figure 13:
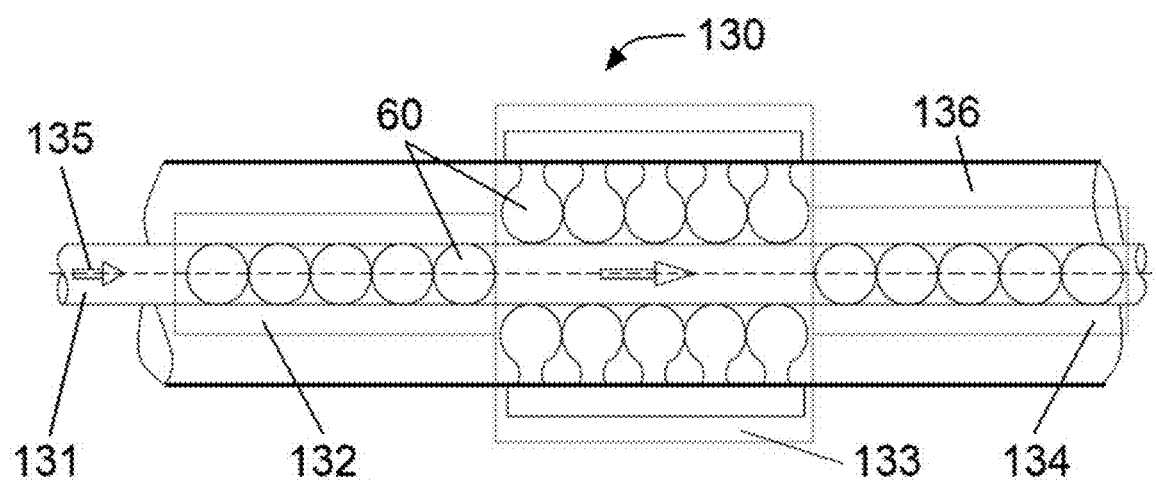
FIG. 13 is a schematic representation of application of acoustic pressure shock waves with focused applicators for the cleaning of grinded meat, according to one embodiment of the present invention.

FIG. 13 presents a ground meat cleaning process 130 that is using acoustic pressure shock wave applicators 60, which are installed along the pipe for ground meat pipe 131. For optimal cleaning of the ground meat, the acoustic pressure shock wave applicators 60 are grouped in clusters of ten (10) applicators formed of two opposing groups of five (5) consecutive acoustic pressure shock wave applicators 60.

Multiple clusters of acoustic pressure shock wave applicators 60 can be installed along ground meat pipe 131 in which the ground meat that needs cleaning moves at a slow speed, in the ground meat movement direction 135. In FIG. 13 are presented three (3) such clusters—first reflectors' cluster 132, second reflectors' cluster 133, and third reflectors' cluster 134. Note that the consecutive clusters 132, 133, and 134 are rotated with 90 degrees relatively to each other, to provide easy access and maintenance. The hot water large pipe 136 surrounds the ground meat pipe 131 and this facilitates the proper functioning of the acoustic pressure shock wave applicators 60 that are practically found inside the hot water large pipe 136. The acoustic pressure shock waves are produce in a liquid inside the acoustic pressure shock wave applicators 60 and then can propagate without any loss through the hot water from the large pipe with hot water 136 until they reach the ground meat pipe 131. The material of the ground meat pipe 131 should have an acoustic impedance that will facilitate the transmission of shock waves without significant energy losses. In this the ground meat can be cleaned with acoustic pressure shock waves 54, or pseudo-planar acoustic pressure shock waves 80, or radial acoustic pressure shock waves 76.

Figure 14:
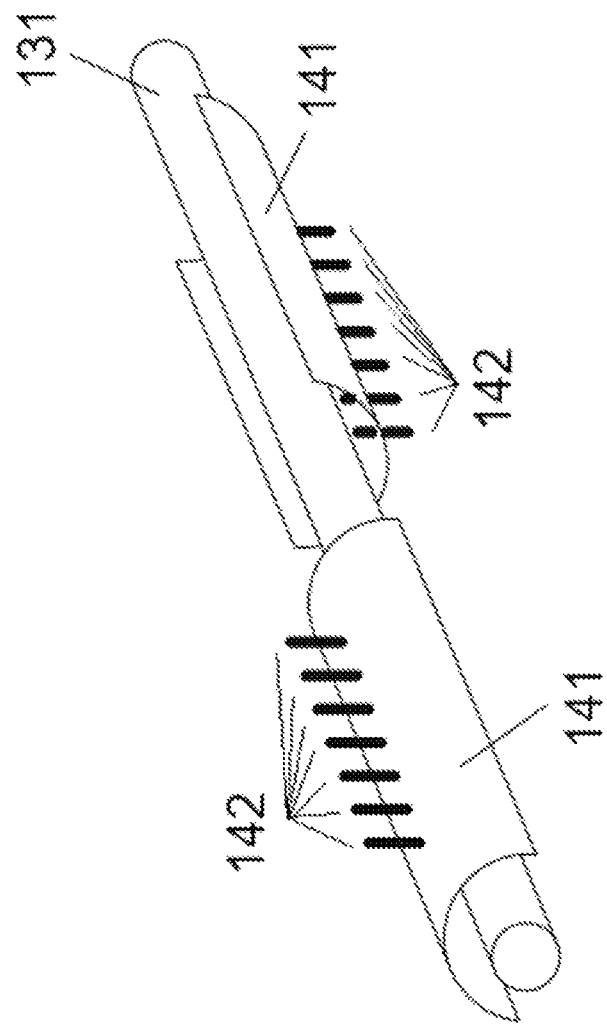
FIG. 14 is a schematic representation of application of acoustic pressure shock waves with pipe applicators for the cleaning of grinded meat, according to one embodiment of the present invention.

FIG. 14 shows a ground meat cleaning process with pipe reflectors 140 that is using pipe reflectors 141 (part of a tube with a parabolic, ellipsoidal or round cross-section), which are used to focus/direct the acoustic pressure shock waves 54, or pseudo-planar acoustic pressure shock waves 80, or radial acoustic pressure shock waves 76 generated by the high voltage discharge across opposing electrodes 142. This construction can create pressure gradients inside the ground meat pipe 131. For this embodiment, an increased number of shocks and/or high energy settings may be used to compensate for the lost in reflective area for the pipe reflectors 141 when compared with acoustic pressure shock wave applicators 60 that incorporate semi-ellipsoids, semi-paraboloid or semi spherical reflectors. As geometry the pipe reflectors 141 are more in the realm of the segment parabolic reflector 102 presented in FIG. 10, since the energy delivered at the surface of ground meat pipe 131, and subsequently to the ground meat from it, is direct proportional to the reflective area used to focus the pressure shock waves in the treatment/cleaning area. The whole assembly can reside inside a hot water large pipe 136 (not shown in FIG. 14) to better facilitate the transmission of acoustic pressure shock waves 54, or pseudo-planar acoustic pressure shock waves 80, or radial acoustic pressure shock waves 76 towards the ground meat pipe 131. The same construction as the one presented in FIG. 14 can use devices that generate pressure shock waves using the piezoelectric or electromagnetic principles.

Food contact surfaces are subject to sanitation after the cleaning processes. Sanitation can employ physical and chemical methods to reduce the pathogenic and spoilage microbes to the acceptable industry microbiological standards. The physical methods often used are hot water, steam mixed with hot water and UV radiation. The most used chemical sanitizers are chlorine based sanitizers, iodophores, and hydrogen peroxide. The acoustic pressure shock waves 54 (see FIG. 5), or pseudo-planar acoustic pressure shock waves 80 (see FIG. 8), or radial acoustic pressure shock waves 76 (see FIG. 7) can be used to clean the food contact surfaces. Any of the embodiments from FIG. 6A, FIG. 6B, FIG. 6C, FIG. 6D, FIG. 6E, FIG. 6F, FIG. 7, or FIG. 8 will work for cleaning the food contact surfaces.

Finally, acoustic pressure shock waves can be used for cleaning of the processed liquid/contaminated liquid that is generated throughout the plant during meat processing. Acoustic pressure shock waves 54 (see FIG. 5), or pseudo-planar acoustic pressure shock waves 80 (see FIG. 8), or radial acoustic pressure shock waves 76 (see FIG. 7) can be used to clean of contaminants the processed liquid/contaminated liquid as independent technology or in conjunction with other technologies.

For all the embodiments presented in this patent, the total number of acoustic pressure shock wave applicators 60 used for cleaning is depending on the animal meat/carcass 11 or small animal carcass/meat 121 dimensions and on the ability to completely clean all pathogens, without affecting the movement speed of the animal meat/carcasses 11 or small animal carcass/meat 121 through the overall meat processing system.

What is claimed is:

1. A method of treating an animal carcass comprising
providing an animal carcass in a containment with an acoustic pressure shock wave applicator operatively coupled to the containment,
applying shock waves from the acoustic pressure shock wave applicator having a reflector adjacent to an acoustic pressure shock wave generating device to the carcass sufficient to reduce contaminants on the carcass, wherein
the shock wave applicator includes a membrane that contains liquid or gas in a cavity of the shock wave applicator that includes the reflector and shock wave generating device;
the shock waves have a compressive phase producing high compressive pressure followed by a tensile phase; and
the shock waves are applied at an angle of from 20° to 70° relative to the surface of the carcass; and
processing the carcass following application of shock waves into meat for consumption.

2. The method of claim 1, further comprising applying the shock waves through air or through a liquid mist in the containment to the carcass.

3. The method of claim 2, further comprising applying the shock waves with at least one of swiveling and translational motion of the shock wave applicator.

4. The method of claim 1, further comprising applying the shock waves to the carcass submerged in liquid in the containment.

5. The method of claim 2, wherein the shock wave generating device includes at least one of an electrohydraulic device, piezoelectric device and electromagnetic device and the reflector is selected from the group consisting of an ellipsoidal reflector, parabolic reflector, spherical reflector and segmental reflector.

6. The method of claim 4, wherein the shock wave generating device includes at least one of an electrohydraulic device, piezoelectric device and electromagnetic device and the reflector is selected from the group consisting of an ellipsoidal reflector, parabolic reflector, spherical reflector and segmental reflector.

7. The method of claim 4, further comprising applying the shock waves with at least one of swiveling and translational motion of the shock wave applicator.

8. The method of claim 1, further comprising applying the shock waves with at least one of swiveling and translational motion of the shock wave applicator.

9. The method of claim 1, further comprising causing cavitation bubbles at the surface of the carcass with shock waves propagated in liquid.

10. The method of claim 1, wherein the shock wave generating device includes at least one of an electrohydraulic device, piezoelectric device and electromagnetic device and the reflector is selected from the group consisting of an ellipsoidal reflector, parabolic reflector, spherical reflector and segmental reflector.

11. The method of claim 10, further comprising applying shock waves to the carcass with swiveling motion of the shock wave applicator.

12. The method of claim 1, wherein the shock wave generating device includes a laser device.

13. A method of treating a plurality of animal carcasses comprising
providing each of a plurality of animal carcasses coupled to a conveyor system into a respective containment with multiple acoustic pressure shock wave applicators operatively coupled to the respective containment, wherein each of the multiple shock wave applicators includes a reflector adjacent a shock wave generating device within a cavity of the applicator covered by a membrane and containing a liquid or gas,
applying shock waves having a compressive phase producing high compressive pressure followed by a tensile phase from each applicator of the multiple acoustic pressure shock wave applicators to each carcass at an angle of from 20° to 70° relative to the surface of the respective carcass and sufficient to reduce contaminants on the respective carcass, and
processing each carcass following application of shock waves into meat for consumption.

14. The method of claim 13, further comprising applying the shock waves through air or through a liquid mist to each respective carcass in a respective containment.

15. The method of claim 13, further comprising applying the shock waves to each respective carcass submerged in liquid in a respective containment.

16. The method of claim 13, wherein for each applicator of the multiple shock wave applicators the shock wave generating device includes at least one of an electrohydraulic device, laser device, piezoelectric device and electromagnetic device and the reflector is selected from the group consisting of an ellipsoidal reflector, parabolic reflector, spherical reflector and segmental reflector.

17. The method of claim 16, wherein at least one applicator of the multiple shock wave applicators undergoes at least one of translational and swivel motion in applying the shock waves.

18. The method of claim 16, wherein shock waves propagated through liquid from each applicator of the multiple shock wave applicators cause cavitation bubbles at the surface of the carcass.

19. The method of claim 13, further comprising automatically inspecting a respective carcass with an inspection module following applying of the shock waves to assess the cleanliness of the respective carcass.

20. The method of claim 13, wherein the shock waves from each applicator of the multiple pressure shock wave applicators are applied through a liquid drape to a respective carcass.

21. The method of claim 20, wherein each reflector of each applicator of the multiple pressure shock wave applicators applying shock waves through a liquid drape includes a parabolic reflector.

* * * * *